(12) United States Patent
Imaki et al.

(10) Patent No.: US 11,327,176 B2
(45) Date of Patent: May 10, 2022

(54) LASER RADAR DEVICE

(71) Applicant: Mitsubishi Electric Corporation, Tokyo (JP)

(72) Inventors: Masaharu Imaki, Tokyo (JP); Takayuki Yanagisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 16/756,043

(22) PCT Filed: Dec. 27, 2017

(86) PCT No.: PCT/JP2017/046912
§ 371 (c)(1),
(2) Date: Apr. 14, 2020

(87) PCT Pub. No.: WO2019/130472
PCT Pub. Date: Jul. 4, 2019

(65) Prior Publication Data
US 2020/0309952 A1 Oct. 1, 2020

(51) Int. Cl.
*G01P 3/36* (2006.01)
*G01S 17/58* (2006.01)
(Continued)

(52) U.S. Cl.
CPC ............ *G01S 17/58* (2013.01); *G01S 7/4911* (2013.01); *G01S 7/4917* (2013.01)

(58) Field of Classification Search
CPC ....... G01S 17/58; G01S 7/4911; G01S 7/4914
See application file for complete search history.

(56) References Cited

U.S. PATENT DOCUMENTS

| 10,539,666 B2 | 1/2020 | Ito et al. |
| 2014/0233013 A1* | 8/2014 | Sakimura .............. G01S 7/4818 356/5.01 |
| 2017/0307648 A1* | 10/2017 | Kotake .................. G01S 17/58 |

FOREIGN PATENT DOCUMENTS

| EP | 3 232 226 A1 | 10/2017 |
| JP | 6-186324 A | 7/1994 |

(Continued)

OTHER PUBLICATIONS

Extended European Search Report dated Aug. 27, 2020 issued in corresponding European Patent Application No. 17 936 462.5.
(Continued)

*Primary Examiner* — Mark Hellner
(74) *Attorney, Agent, or Firm* — Birch, Stewart, Kolasch & Birch, LLP

(57) ABSTRACT

A laser radar device includes: a primary light source configured to combine laser beams having different wavelengths to generate primary light; an optical splitter configured to split the primary light into transmission light and reference light; an optical modulator configured to modulate the transmission light to generate modulated transmission light; an optical transmitter/receiver system configured to emit the modulated transmission light into an external space and receive light scattered or diffused by a target; an optical combiner configured to combine the reference light and the received light to generate an optical beat signal; and a photodetector circuit configured to perform an optical-to-electrical signal conversion of the optical beat signal to generate a received signal; and a signal processing circuit configured to calculate a measurement value related to the target on the basis of the received signal.

8 Claims, 14 Drawing Sheets

(51) Int. Cl.
   *G01S 7/4911* (2020.01)
   *G01S 7/4912* (2020.01)

(56) References Cited

FOREIGN PATENT DOCUMENTS

| | | | |
|---|---|---|---|
| JP | 2004-219207 A | 8/2004 | |
| JP | 2004219207 A * | 8/2004 | ............. Y02A 90/10 |
| JP | 2009-162678 A | 7/2009 | |
| JP | 2015-179291 A | 10/2015 | |
| JP | 6076541 B2 | 2/2017 | |
| WO | WO 2016/210401 A1 | 12/2016 | |

OTHER PUBLICATIONS

Drobinski et al., "Spectral diversity technique for heterodyne Doppler lidar that uses hard target returns", Applied Optics, vol. 39, No. 3, Jan. 20, 2000, pp. 376-385.
International Search Report issued in PCT/JP2017/046912 (PCT/ISA/210), dated Apr. 3, 2018.

* cited by examiner

LASER RADAR DEVICE

TECHNICAL FIELD

The present invention relates to laser radar technology for detecting information such as the velocity of a target by measuring light scattered or reflected by the target having been irradiated with a laser beam.

BACKGROUND ART

Laser radar devices are capable of detecting information such as the velocity of a target or the distance to the target by emitting a laser beam into an external space, receiving light scattered or reflected by the target, and measuring the received light. For example, there is known laser radar technology for detecting observation values such as the wind velocity by receiving scattered light from targets such as aerosols (fine particles of liquids or solids that float in the atmosphere), cloud particles, or atmospheric molecules and measuring the received light. There is also known laser radar technology for detecting the distance to a target by receiving diffused light reflected by the target such as a structure, terrain, or a moving object and measuring the received light.

Patent Literature 1 discloses a laser radar device (hereinafter referred to as "conventional laser radar device") that detects the wind velocity by performing signal processing on a received signal obtained by optical heterodyne detection. This conventional laser radar device includes: a laser light source that outputs CW light having a single frequency; an optical splitter that splits the CW light from into first light for transmission and second light for reference; a pulse modulator that applies pulse modulation to the first light; a frequency shifter that generates reference light by shifting the frequency of the second light; and an optical transmitter/receiver system that emits output light of the pulse modulator into the atmosphere and receives scattered light from the atmosphere as received light. The conventional laser radar device further includes: an optical coupler that combines the received light and the reference light; an optical receiver that converts output light of the optical coupler into an electrical signal, an A/D converter that converts the electrical signal into a digital received signal; and a signal processing unit that performs signal processing on the received signal to detect the wind velocity in the line-of-sight direction.

CITATION LIST

Patent Literature

Patent Literature 1: Japanese Patent Application Publication No. 2009-162678.

SUMMARY OF THE INVENTION

Technical Problem

When a laser light source that outputs a laser beam having a narrow spectral linewidth is used in the conventional laser radar device as described above, interference with diffused light reflected by the surface of a target occurs, thereby generating speckle noises. In the case of a laser radar device, speckle noises cause the disadvantage that the amplitude of received light is changed and that the signal-to-noise ratio (SNR) of the received signal is degraded.

In view of the above, an object of the present invention is to provide a laser radar device capable of suppressing generation of speckle noises and improving the signal-to-noise ratio of a received signal.

Solution to the Problem

In accordance with an aspect of the present invention, there is provided a laser radar device which includes: a primary light source configured to combine a plurality of laser beams having different wavelengths respectively to generate primary light; an optical splitter configured to split the primary light into transmission light and reference light; an optical modulator configured to modulate the transmission light to generate modulated transmission light; an optical transmitter/receiver system configured to emit the modulated transmission light into an external space and receive light scattered or diffused by a target in the external space; an optical combiner configured to combine the reference light and the light received by the optical transmitter/receiver system to generate an optical beat signal; a photodetector circuit configured to perform an optical-to-electrical signal conversion of the optical beat signal to generate a received signal; and a signal processing circuit. The signal processing circuit includes: a frequency analyzer configured to perform frequency analysis on the received signal with a frequency resolution specified in advance to calculate a spectrum of the received signal; and a measurement value calculator configured to calculate a measurement value related to the target on a basis of the calculated spectrum. The different wavelengths are set to cause a frequency difference between peaks that correspond to the different wavelengths and appear in the spectrum of the received signal, to be equal to or less than the frequency resolution.

Advantageous Effects of the Invention

According to the present invention, generation of speckle noises can be suppressed, and the signal-to-noise ratio of the received signal can be improved.

DESCRIPTION OF EMBODIMENTS

Hereinafter, various embodiments of the present invention will be described in detail with reference to the drawings. Note that components denoted by the same symbol throughout the drawings have the same structure and the same function.

First Embodiment

Figure 1:
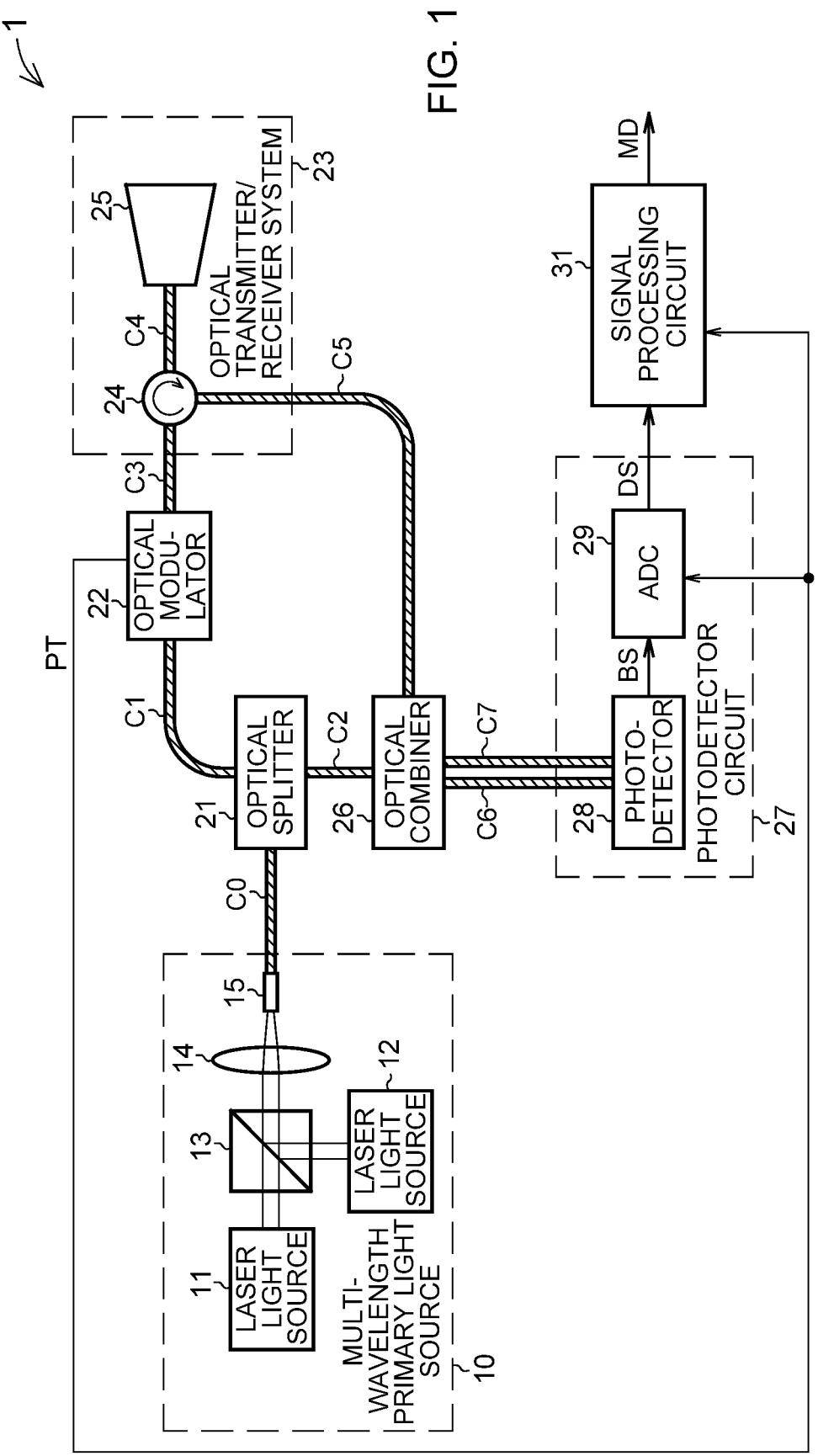
FIG. 1 is a block diagram illustrating a schematic configuration of a laser radar device according to a first embodiment of the present invention.

FIG. 1 is a diagram illustrating a schematic configuration of a laser radar device 1 according to a first embodiment of the present invention. As illustrated in FIG. 1, the laser radar device 1 includes: a multi-wavelength primary light source 10 (hereinafter simply referred to as "primary light source 10") configured to combine laser beams having different wavelengths, respectively, to generate primary light; an optical splitter 21 configured to split the primary light input from the primary light source 10 into transmission light and reference light; an optical modulator 22 configured to perform frequency modulation and amplitude modulation on the transmission light to generate modulated transmission light; an optical transmitter/receiver system 23 configured to emit the modulated transmission light in a specific line-of-sight direction into an external space and receive light scattered or diffused by a target; an optical combiner 26 configured to combine the received light and the reference light to generate an optical beat signal; a photodetector circuit 27 configured to perform an optical-to-electrical signal conversion of the optical beat signal to generate an analog received signal (heterodyne detection signal), and perform an A/D conversion of the analog received signal into a digital received signal; and a signal processing circuit 31 configured to calculate a measurement value related to the target on the basis of the digital received signal. Note that the optical combiner 26 and the photodetector circuit 27 are included in an optical heterodyne detector.

The primary light source 10 and the optical splitter 21 are optically coupled to each other via an optical transmission line C0, the optical splitter 21 and the optical modulator 22 are optically coupled to each other via an optical transmission line C1, the optical splitter 21 and the optical combiner 26 are optically coupled to each other via an optical transmission line C2, the optical modulator 22 and the optical transmitter/receiver system 23 are optically coupled to each other via an optical transmission line C3, the optical transmitter/receiver system 23 and the optical combiner 26 are optically coupled to each other via an optical transmission line C5, and the optical combiner 26 and the photodetector circuit 27 are optically coupled to each other via optical transmission lines C6 and C7. For example, these optical transmission lines C0 to C3 and C5 to C7 can be implemented by optical fiber cables.

As illustrated in FIG. 1, the primary light source 10 includes laser light sources 11 and 12, an optical combiner 13, an optical condensing system 14, and an optical connector 15. The laser light sources 11 and 12 are optical oscillators that output laser beams having their respective spectral linewidths (hereinafter referred to as "linewidths") which are narrow. Each of the laser light sources 11 and 12 can be configured to output a laser beam with a narrow linewidth that is about equal to or less than 100 MHz, for example. These laser beams are linearly polarized light whose polarization direction is maintained in a certain direction. In this case, the frequency difference between these laser beams is selected to be equal to or greater than 100 MHz. Such laser light sources 11 and 12 can be implemented by a semiconductor laser or a solid-state laser.

On the other hand, the primary light source 10 is not limited to the configuration illustrated in FIG. 1. For example, an integrable tunable laser assembly (ITLA) or an optical comb light source capable of simultaneously generating light of wavelengths may be used. Furthermore, each of the laser light sources 11 and 12 does not need to be implemented by a single optical oscillator that outputs light having a single wavelength. Each of the laser light sources 11 and 12 may include optical oscillators that simultaneously output light beams having wavelengths in a predetermined wavelength width.

The optical combiner 13 combines the laser beams incident from the laser light sources 11 and 12 to generate primary light, and outputs the primary light toward the optical condensing system 14. The optical combiner 13 can be implemented by, for example, a branch mirror using a dielectric multilayer film filter or a beam splitter. The optical condensing system 14 condenses the primary light incident from the optical combiner 13 on the light input terminal of the optical connector 15. The optical connector 15 feeds the primary light incident from the optical condensing system 14 into the optical transmission line C0.

The optical splitter 21 is an optical component that distributes the primary light input from the primary light source 10 via the optical transmission line C0 to the optical transmission lines C1 and C2. That is, the optical splitter 21 splits the primary light input thereto into transmission light and reference light at a predetermined branching ratio and outputs the transmission light to the optical transmission line C1 and the reference light to the optical transmission line C2. The branching ratio of the optical splitter 21 is determined in advance by system design. For example, the optical splitter 21 can be implemented by a branch mirror using a dielectric multilayer film filter or a beam splitter.

The optical modulator 22 generates modulated transmission light having a modulation frequency $f_m$ by performing frequency modulation and intensity modulation on the transmission light input from the optical splitter 21 via the optical transmission line C1. In other words, the optical modulator 22 shifts the frequency of the transmission light by modulating the frequency of the transmission light and converting the transmission light into pulses by modulating the intensity of the transmission light. At this point, the optical modulator 22 supplies a pulse trigger signal PT indicating the timing of pulsing the transmission light to the photodetector circuit 27 and the signal processing circuit 31, and thus the photodetector circuit 27 and the signal processing circuit 31 can operate in synchronization with the supplied pulse trigger signal PT.

Here, the optical modulator 22 intensity-modulates the transmission light with a predetermined pulse width and pulse repetition frequency (PRF). The pulse width corresponds to a range resolution value. A user can set a pulse width corresponding to a desired range resolution value from the outside of the laser radar device 1. Alternatively, the optical modulator 22 may operate with a fixed pulse width and a fixed PRF having been set at the time of system design. Furthermore, in a case where the intensity of the output light of the optical modulator 22 is insufficient, an optical amplifier may be added as a subsequent stage after the optical modulator 22.

For example, the intensity modulator portion of the optical modulator 22 can be implemented by a lithium niobate (LN) modulator, and the frequency modulator portion of the optical modulator 22 can be implemented by an acousto-optical frequency shifter (AOFS) or frequency shifter including optical phase modulators. Alternatively, both the intensity modulator portion and the frequency modulator portion of the optical modulator 22 can be implemented by an acousto-optic element. As the pulse trigger signal PT, a transistor-transistor logic (TTL) pulse signal with a TTL level of 5 volts be used.

The optical transmitter/receiver system 23 includes an optical circulator 24 and optical antenna 25 that are optically coupled to each other via an optical transmission line C4. The optical circulator 24 is a nonreciprocal optical component having three ports. That is, the optical circulator 24 couples the optical transmission line C3 with the optical transmission line C4 for the modulated transmission light input in the forward direction from the optical transmission line C3, but does not couple the optical transmission line C4 with the optical transmission line C5. As a result, the optical circulator 24 supplies most of the modulated transmission light input in the forward direction from the optical transmission line C3 to the optical antenna 25. The optical antenna 25 emits the modulated transmission light in a specific line-of-sight direction in the external space. On the other hand, for received light input in the reverse direction from the optical transmission line C4, the optical transmission line C4 is coupled to the optical transmission line C5, but the optical transmission line C4 is not coupled to the optical transmission line C3. As a result, the optical circulator 24 supplies most of the received light input in the reverse direction from the optical transmission line C4 to the optical transmission line C5.

Such an optical circulator 24 can be implemented by, for example, a spatial propagation circulator including a quarter-wave plate and a polarization beam splitter. In this case, for example, modulated transmission light transmitted through the polarization beam splitter as vertical polarization is emitted from the optical antenna 25 after being converted into circular polarization by the quarter-wave plate. The received light received by the optical antenna 25 is converted into horizontal polarization by the quarter-wave plate and then is reflected by the polarization beam splitter in the direction of the optical transmission line C5. In this manner, the spatial propagation circulator can separate the modulated transmission light and the received light from each other.

The optical antenna 25 is an optical system capable of collimating the input modulated transmission light and emitting it to the external space, and receiving scattered light or diffused light coming from a target in the external space as received light. The received light propagates through the optical transmission line C4 and the optical circulator 24 and enters the optical combiner 26. Targets in the external space include targets such as aerosols (fine particles of liquids or solids that float in the atmosphere), cloud particles, or atmospheric molecules, or hard targets such as structures, terrain, or moving objects (for example, vehicles). Such an optical antenna 25 can be implemented by an optical telescope or a camera lens. The optical antenna 25 may also include an optical scanner (not illustrated) that scans a predetermined range in the external space with modulated transmission light and a light condensing adjustment function.

Next, the optical combiner 26 combines the reference light input from the optical transmission line C2 and the received light input from the optical transmission line C5 to generate composite light containing optical beat signal components. The composite light propagates through the optical transmission lines C6 and C7 and enters the photodetector circuit 27. The optical combiner 26 of the present embodiment outputs the composite light beams (positive-phase and negative-phase light beams) having their respective phases different from each other by 180°, to the optical transmission lines C6 and C7, to ensure compatibility with the balanced receiver configuration of the photodetector circuit 27. Such an optical combiner 26 can be implemented by, for example, a 90° hybrid coupler.

The photodetector circuit 27 includes a photodetector 28 having the balanced receiver configuration and an analog-to-digital (A/D) converter (ADC) 29 that converts an output of the photodetector 28 into a digital signal. The photodetector 28 includes two photoreceptor elements (e.g., photodiodes) that perform optical-to-electrical signal conversions of the positive-phase light beam input from the optical transmission line C6 and the negative-phase light beam input from the optical transmission line C7, respectively. The photodetector 28 generates an analog received signal BS on the basis of a difference between output currents of the photoreceptor elements. Since the photodetector circuit 27 has such a balanced receiver configuration, it is possible to reduce relative intensity noises (RINs) caused by the primary light source 10.

The ADC 29 converts the analog received signal BS into a digital received signal DS (hereinafter simply referred to as "received signal DS") by sampling the analog received signal BS using the pulse trigger signal PT supplied from the optical modulator 22 as a trigger. The ADC 29 outputs the received signal DS to the signal processing circuit 31. For example, the ADC 29 can be implemented by a double-integration A/D converter, a successive-approximation A/D converter, or a parallel-comparison A/D converter.

Figure 2:
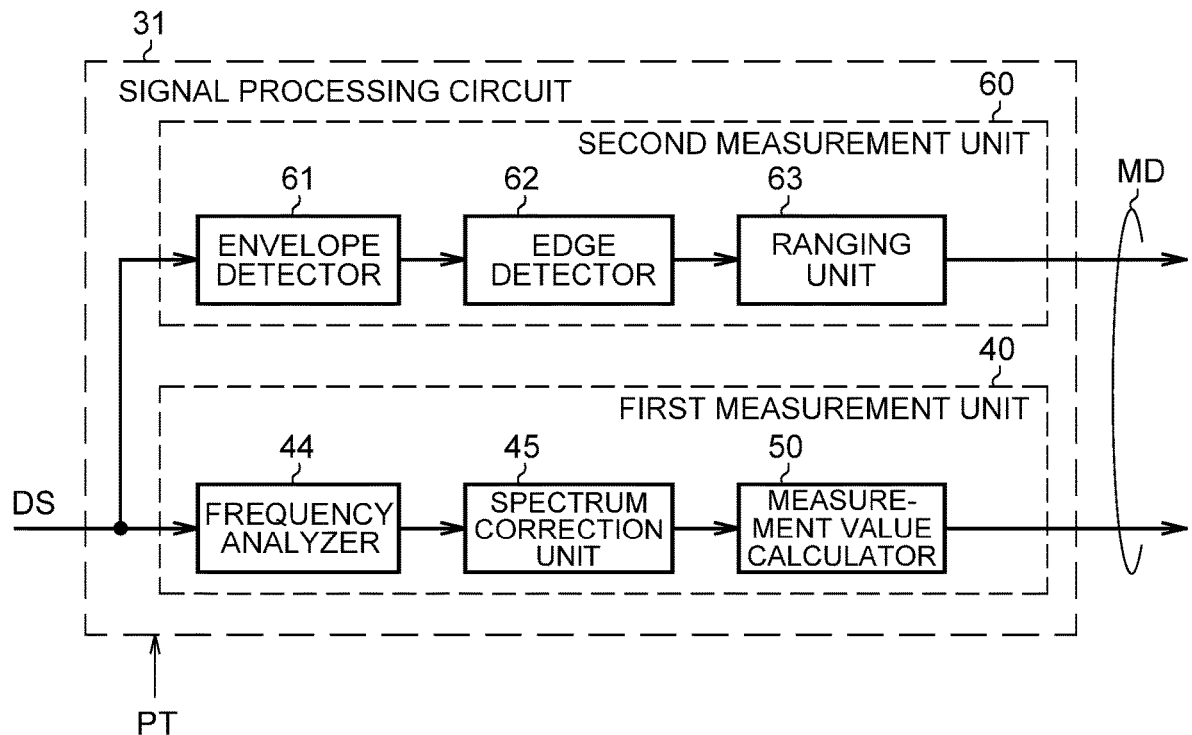
FIG. 2 is a block diagram schematically illustrating a configuration example of a signal processing circuit according to the first embodiment.

The signal processing circuit 31 has a function of calculating measurement values such as the relative velocity (traveling velocity) of the laser radar device 1 with respect to the target and the distance to the target on the basis of the received signal DS, which is a carrier signal in the digital domain, and outputting measurement data MD including these measurement values. FIG. 2 is a block diagram schematically illustrating a configuration example of the signal processing circuit 31 according to the first embodiment.

As illustrated in FIG. 2, the signal processing circuit 31 includes a first measurement unit 40 and a second measurement unit 60. The first measurement unit 40 includes a frequency analyzer 44, a spectrum correction unit 45, and a measurement value calculator 50.

The frequency analyzer 44 performs frequency analysis including fast Fourier transform (FFT) on the received signal DS with a frequency resolution Δf specified in advance to calculate a spectrum of the received signal DS (hereinafter referred to as "received spectrum") and outputs a spectrum signal indicating the received spectrum to the spectrum correction unit 45. The received spectrum may be either a power spectrum indicating the relationship between the power and the frequency of the received signal DS or an amplitude spectrum indicating the relationship between the amplitude and the frequency of the received signal DS. The FFT is executed with the number of FFT bins $N_{FFT}$. $N_{FFT}$ represents the number of points used for the FFT, and for example, a value of 256 is used as the number of FFT bins $N_{FFT}$. The frequency resolution Δf is equal to the width of each frequency bin of the received spectrum.

The spectrum correction unit 45 corrects the received spectrum to generate a correction spectrum, and outputs a signal indicating the generated correction spectrum to the measurement value calculator 50. Specifically, the spectrum correction unit 45 can correct the shape of the received spectrum by removing, from the received spectrum, a noise floor (relationship between the frequency and a noise level) measured in advance in a state where no signal light is received.

The measurement value calculator 50 calculates a measurement value in the line-of-sight direction on the basis of the correction spectrum. Specifically, the measurement value calculator 50 can calculate the relative velocity of the target in the line-of-sight direction as the measurement value on the basis of the calculated Doppler shift amount by calculating the Doppler shift amount of the laser beam, that is, a Doppler shift frequency, from the correction spectrum. In a case where the Doppler shift amount is zero, the modulation frequency $f_m$ given by the optical modulator 22 becomes the carrier frequency. On the other hand, in a case where a target is travelling relative to the laser radar device 1, a frequency shifted from the modulation frequency $f_m$ by the Doppler shift frequency becomes the carrier frequency. The measurement value calculator 50 can also calculate a three-dimensional relative velocity vector on the basis of measurement values in line-of-sight directions.

On the other hand, the second measurement unit 60 includes an envelope detector 61, an edge detector 62, and a ranging unit 63 as illustrated in FIG. 2. The envelope detector 61 has a predetermined transmission frequency bandwidth for the received signal DS. The envelope detector 61 detects an envelope of the received signal DS and outputs an envelope detection signal indicating the detection result to the edge detector 62. The edge detector 62 detects an edge of the waveform of the envelope detection signal (for example, a rising edge, a falling edge, or both the rising edge and the falling edge) and outputs an edge detection signal indicating the detection result to the ranging unit 63. A TTL signal can be used as an edge detection signal.

The ranging unit 63 is capable of measuring delay time τ indicating a time difference between transmission time of a transmission light pulse and detection time of received light corresponding thereto and calculating the distance to the target on the basis of the delay time T. For example, the ranging unit 63 can be implemented by a time measurer such as a time-to-digital converter (TDC) or a time-to-amplitude converter (TAC).

A hardware configuration of the signal processing circuit 31 described above may be implemented by one or more processors having a semiconductor integrated circuit such as a digital signal processor (DSP), an application specific integrated circuit (ASIC), or a field-programmable gate array (FPGA). Alternatively, the hardware configuration of the signal processing circuit 31 may be implemented by one or more processors including an arithmetic device such as a central processing unit (CPU) or a graphics processing unit (GPU) that executes software or firmware program codes read from a memory. The hardware configuration of the signal processing circuit 31 may be implemented by one or more processors including a combination of a semiconductor integrated circuit such as a DSP and an arithmetic device such as a CPU.

Figure 3:
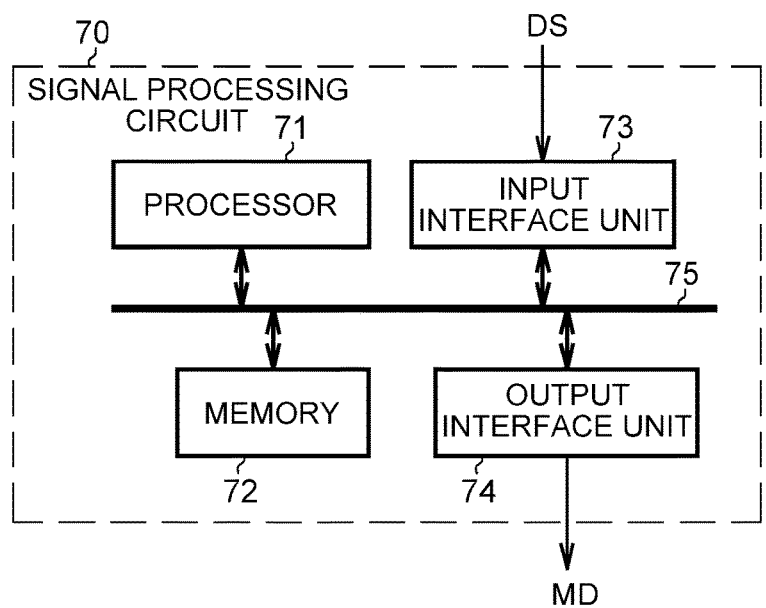
FIG. 3 is a block diagram schematically illustrating a hardware configuration example of the signal processing circuit according to the first embodiment.

FIG. 3 is a block diagram schematically illustrating a signal processing circuit 70 which is a hardware configuration example that implements the function of the signal processing circuit 31. The signal processing circuit 70 includes a processor 71, a memory 72, an input interface unit 73, an output interface unit 74, and a signal path 75. The signal path 75 is a bus for connecting the processor 71, the memory 72, the input interface unit 73, and the output interface unit 74 to each other. The input interface unit 73 has a function of transferring the received signal DS input from the outside to the processor 71 via the signal path 75. The processor 71 is capable of calculating a measurement value related to the target by performing digital signal processing on the transferred received signal DS and outputting measurement data MD indicating these measurement values to an external device via the signal path 75 and the output interface unit 74.

Here, the memory 72 is a data storage area used when the processor 71 executes digital signal processing. In a case where the processor 71 incorporates an arithmetic device such as a CPU, the memory 72 includes a data storage area for storing program codes of software or firmware executed by the processor 71. As the memory 72, for example, a semiconductor memory such as a read only memory (ROM) and a synchronous dynamic random access memory (SDRAM) can be used.

Next, the operations and configuration of the laser radar device 1 will be described in more detail.

Figure 4:
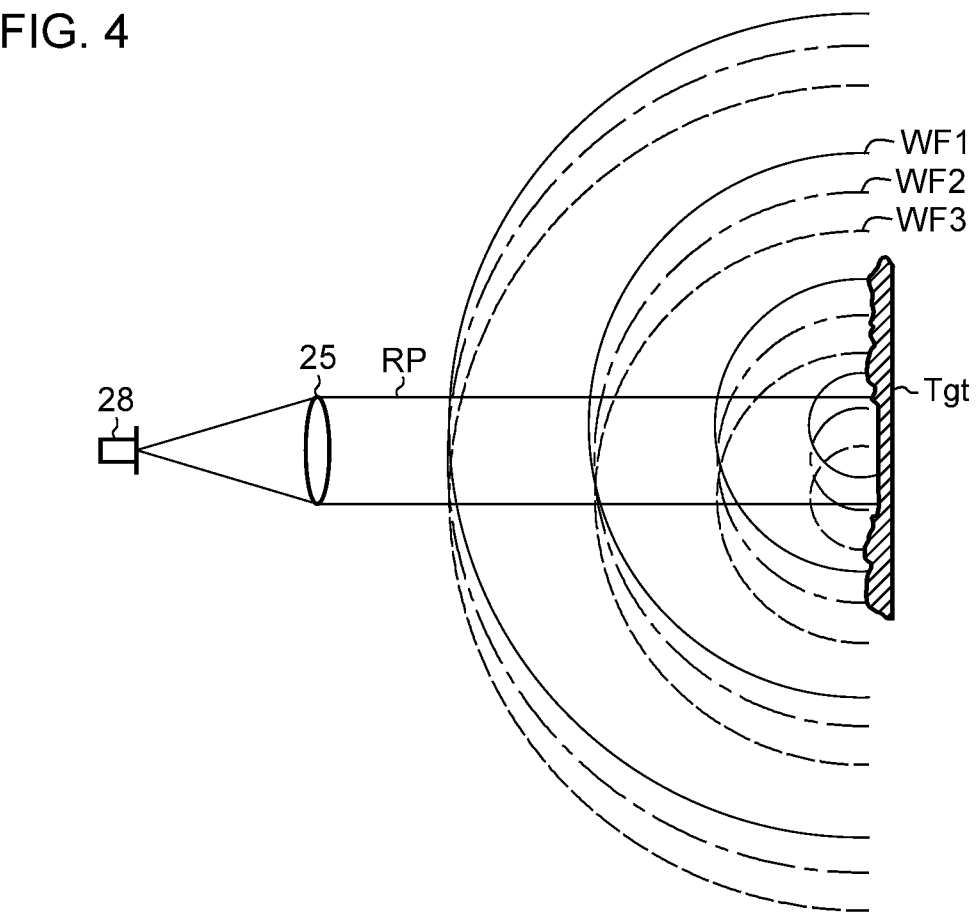
FIG. 4 is a diagram schematically illustrating a state of diffused light reflected by a target.

The optical antenna 25 is capable of collimating the input modulated transmission light and emitting it to the external space, and receiving scattered light or diffused light coming from a target in the external space as received light. It is known that when a laser light source that outputs a laser beam having a narrow linewidth is used, a fine speckle pattern with high contrast, that is, speckle noises appear on the observation surface. If only a single laser light source 11 is used in the present embodiment, when speckle noises occur on the optical antenna surface of the optical transmitter/receiver system 23, in some cases, the speckle noises are coupled with the optical transmission line C4 and in other cases, the speckle noises are not coupled to the optical transmission line C4. FIG. 4 is a diagram schematically illustrating a state of diffused light reflected by a target Tgt in a case where only a single laser light source 11 is used. In this case, wavefronts WF1, WF2, and WF3 of the diffused light reflected at multiple points on the measurement target surface of the target Tgt interfere with each other in a propagation path RP between the target Tgt and a photoreceptor surface. Such interference of light is considered to cause speckle noises. When heterodyne detection is executed using only with the single laser light source 11, light intensity fluctuation due to speckle noises occurs typically on the basis of a Gaussian distribution. As a result, when the measurement value is calculated with one shot of the transmission light pulse, it may become substantially impossible to calculate the measurement value with the amplitude of the received signal DS fluctuating greatly or the amplitude becoming almost zero.

In contrast, in the present embodiment, the primary light source 10 generates the primary light by combining laser beams having different wavelengths respectively, thereby allowing for multiple interference conditions corresponding to the different wavelengths which occur in the propagation path between the target Tgt and the photoreceptor surface. As a result, it becomes possible to suppress probabilistic fluctuations in the intensity of the received signal DS which occur due to speckle noises.

In the present embodiment, although the number of independent laser light sources 11 and 12 is two, no limitation to the number is intended. In a case where n laser light sources are used where n is an integer equal to or greater than 2, assuming that the level of the received signal DS indicates a value within the range of "0" to "1", fluctuations in the received intensity (standard deviation) is derived as $n^{1/2}$.

Next, referring to FIG. 2, in the first measurement unit 40 of the signal processing circuit 31, the frequency analyzer 44 calculates the received spectrum by executing frequency analysis at a predetermined frequency resolution $\Delta f$ on the received signal DS that is a carrier signal in the digital domain. The spectrum correction unit 45 generates a correction spectrum by correcting the received spectrum. The measurement value calculator 50 is capable of calculating the relative velocity of the target as a measurement value from the correction spectrum. Specifically, the measurement value calculator 50 detects a peak appearing in the correction spectrum by the maximum-value detection or centroid method, and calculates the Doppler shift amount (Doppler shift frequency) $\delta$ on the basis of the position of the detected peak. The measurement value calculator 50 is capable of calculating the relative velocity $V_r$ of the target in the line-of-sight direction from the Doppler shift amount $\delta$.

Figure 5:
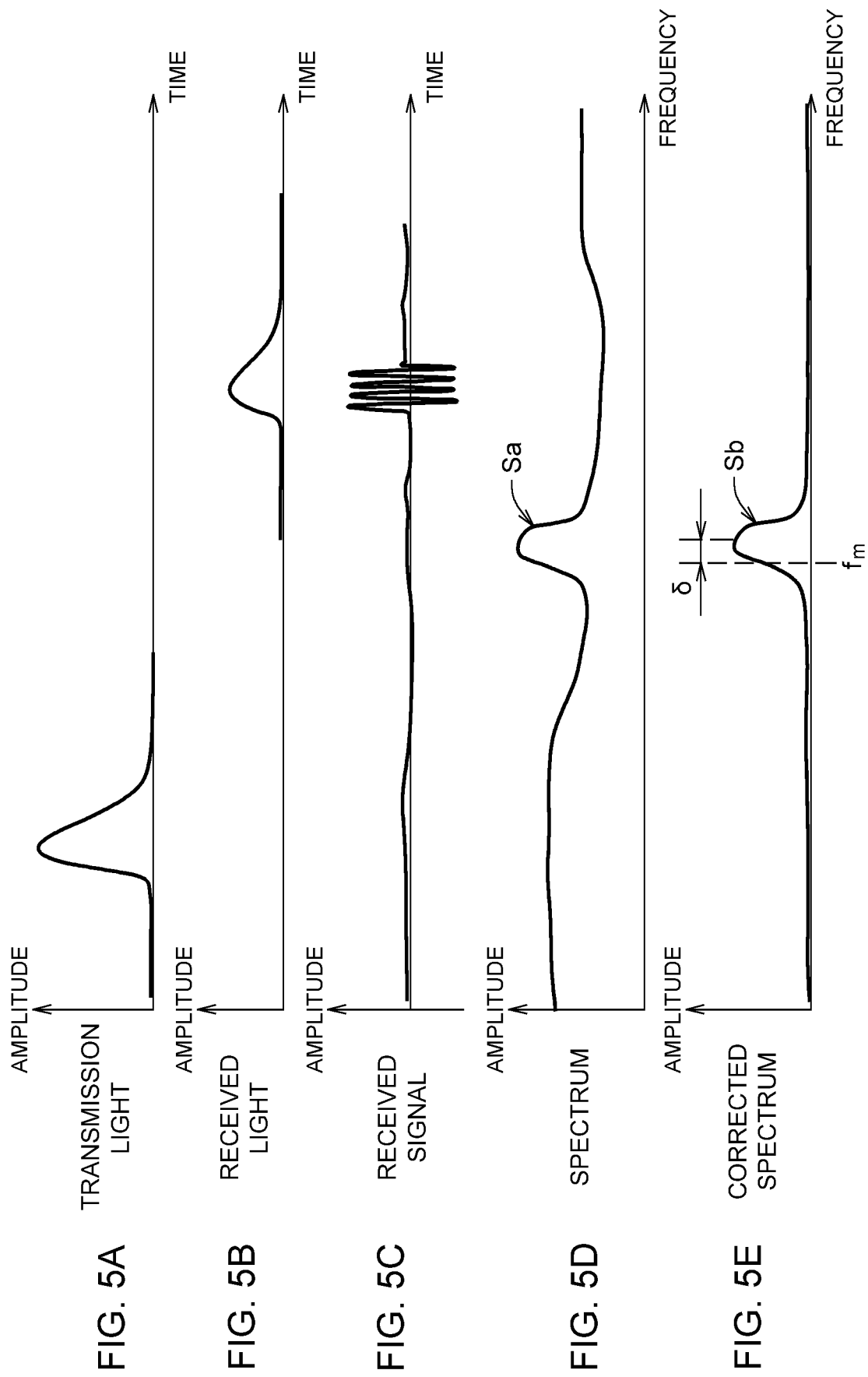
FIGS. 5A to 5E are graphs illustrating examples of transmission light, received light, a received signal (heterodyne detection signal), a received spectrum, and a correction spectrum, respectively.

FIGS. 5A to 5E are graphs illustrating examples of transmission light, received light, a received signal (heterodyne detection signal), a received spectrum, and a correction spectrum, respectively. When transmission light having the amplitude illustrated in FIG. 5A is transmitted, received light having the amplitude illustrated in FIG. 5B is received. FIG. 5C is a graph illustrating a received signal waveform obtained from the received light illustrated in FIG. 5B. FIG. 5D is a graph illustrating a received spectrum obtained from the received signal waveform illustrated in FIG. 5C. The received spectrum has a carrier frequency component Sa. FIG. 5E is a graph illustrating a correction spectrum obtained by correcting the received spectrum illustrated in FIG. 5D. This correction spectrum has a carrier frequency component (Doppler shift spectrum component) Sb. The measurement value calculator 50 is capable of detecting the peak of the carrier frequency component (Doppler shift spectrum component) Sb and calculating the Doppler shift amount $\delta$ on the basis of the position of the detected peak.

In a case where the Doppler shift amount $\delta$ is zero, the modulation frequency $f_m$ given by the optical modulator 22 becomes the carrier frequency corresponding to the peak position. On the other hand, in a case where the target is relatively travelling, a frequency shifted from the modulation frequency $f_m$ by the Doppler shift frequency $\delta$ becomes the carrier frequency corresponding to the peak position. The relationship among the Doppler shift amount $\delta$, the wavelength $\lambda$ of the laser beam, and the relative velocity $V_r$ is expressed by the following mathematical expression (1).

$$V_r = \lambda \times \delta / 2. \tag{1}$$

Since the laser light sources 11 and 12 use different wavelengths $\lambda_1$ and $\lambda_2$, respectively, Doppler shift amounts $\delta 1$ and $\delta 2$ that are generated in correspondence with the wavelengths $\lambda_1$ and $\lambda_2$ are also different from each other. In this case, relative velocities $V_{r1}$ and $V_{r2}$ corresponding to the Doppler shift amounts $\delta 1$ and $\delta 2$, respectively, are given by the following mathematical expressions (2A) and (2B).

$$V_{r1} = \lambda_1 \times \delta 1 / 2. \tag{2A}$$

$$V_{r2} = \lambda_2 \times \delta 2 / 2. \tag{2B}$$

Figure 6:
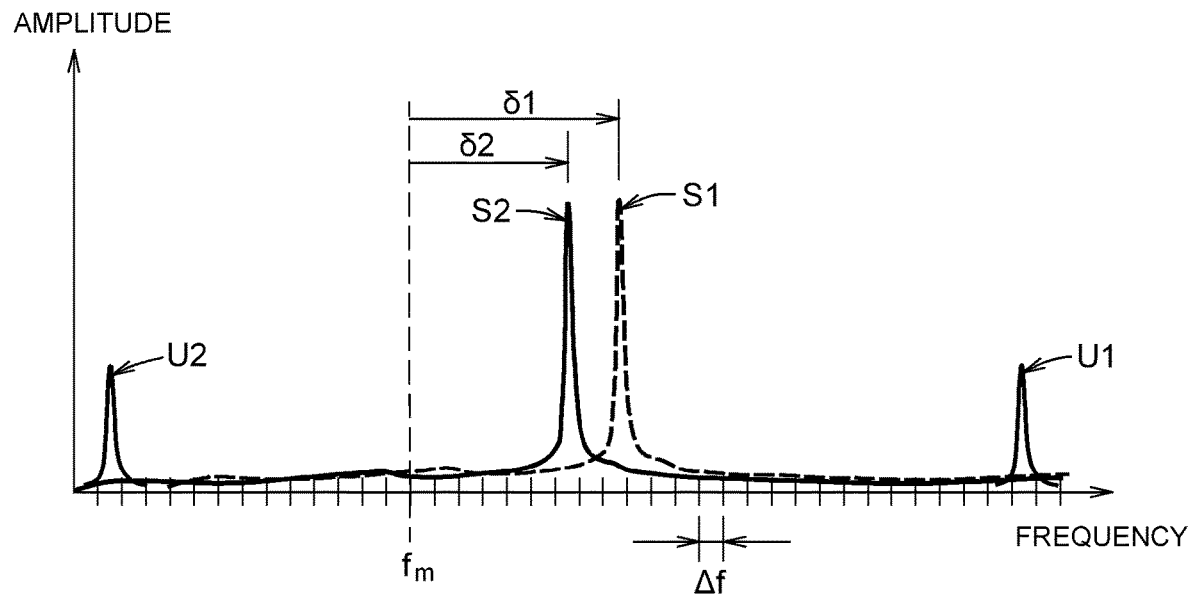
FIG. 6 is a graph illustrating an example of Doppler shift spectrum components.

For example, let us consider a condition that the wavelengths $\lambda_1$ and $\lambda_2$ are selected as $\lambda_1 = 1550.0$ nm and $\lambda_2 = 1551.0$ nm. In a case where the maximum value $V_{max}$ of the absolute value of a velocity in the measurable range of the relative velocity of the target (hereinafter referred to as "velocity measurement range") is 100 m/s under this condition, when the target travels at a relative velocity of the maximum value $V_{max}$, the Doppler shift amount $\delta 1$ becomes 129.032 MHz, and the Doppler shift amount $\delta 2$ becomes 128.949 MHz. FIG. 6 is a graph schematically illustrating an example of Doppler shift spectrum components S1 and S2 corresponding to the wavelengths $\lambda_1$ and $\lambda_2$, respectively, under such conditions. In FIG. 6, S1 denotes a Doppler shift spectrum component corresponding to the wavelength $\lambda_1$ in the correction spectrum, and S2 denotes a Doppler shift spectrum component corresponding to the wavelength $\lambda_2$ in the correction spectrum. Also illustrated in FIG. 6 are unwanted frequency components U1 and U2 such as harmonic components. These unwanted frequency components U1 and U2 will be described later.

In the example of FIG. 6, the two peaks of the Doppler shift spectrum components S1 and S2 do not fit in the same frequency bin. In other words, the frequency difference between the peaks of the Doppler shift spectrum components S1 and S2 is larger than the frequency bin width $\Delta f$ that corresponds to the frequency resolution. If these two peaks of the Doppler shift spectrum components S1 and S2 are located at different frequency bins, peak detection may fail or the calculation accuracy of the relative velocity $V_r$ may be degraded under an environment which causes poor reception quality. For example in a case where the intensity of the received light is low, or when the signal-to-noise ratio of the received signal DS is degraded, the peak detection fails or the calculation accuracy of the relative velocity $V_r$ decreases.

Therefore, in the present embodiment, the emission wavelengths $\lambda_1$ and $\lambda_2$ of the laser light sources 11 and 12 are selected such that the peaks of the Doppler shift spectrum components S1 and S2 are positioned in the same frequency bin. In other words, the emission wavelengths $\lambda_1$ and $\lambda_2$ of the laser light sources 11 and 12 are set such that the frequency difference between peaks corresponding to the wavelengths $\lambda_1$ and $\lambda_2$, which appear in the spectrum of the received signal DS on which frequency analysis is not performed, is equal to or less than the frequency resolution (width of each frequency bin) $\Delta f$ for an arbitrary velocity in a velocity measurement range. This allows the peaks corresponding to the wavelengths $\lambda_1$ and $\lambda_2$ which appear in the received spectrum, to be positioned within the same frequency bin.

More specifically, it is desirable to select laser light sources 11 and 12 that output laser beams of wavelengths $\lambda_1$ and $\lambda_2$ that satisfy the following in mathematical expression (3) where the maximum absolute value of a velocity in the velocity measurement range is denoted by $V_{max}$, the maximum wavelength of wavelengths $\lambda_1$ and $\lambda_2$ is denoted by $\lambda_{max}$, the minimum wavelength of wavelengths $\lambda_1$ and $\lambda_2$ is denoted by $\lambda_{min}$, and the frequency resolution (width of each frequency bin) is denoted by $\Delta f$.

$$\Delta f > 2 \times V_{max} \times (1/\lambda_{min} - 1/\lambda_{max}). \quad (3)$$

Figure 7:
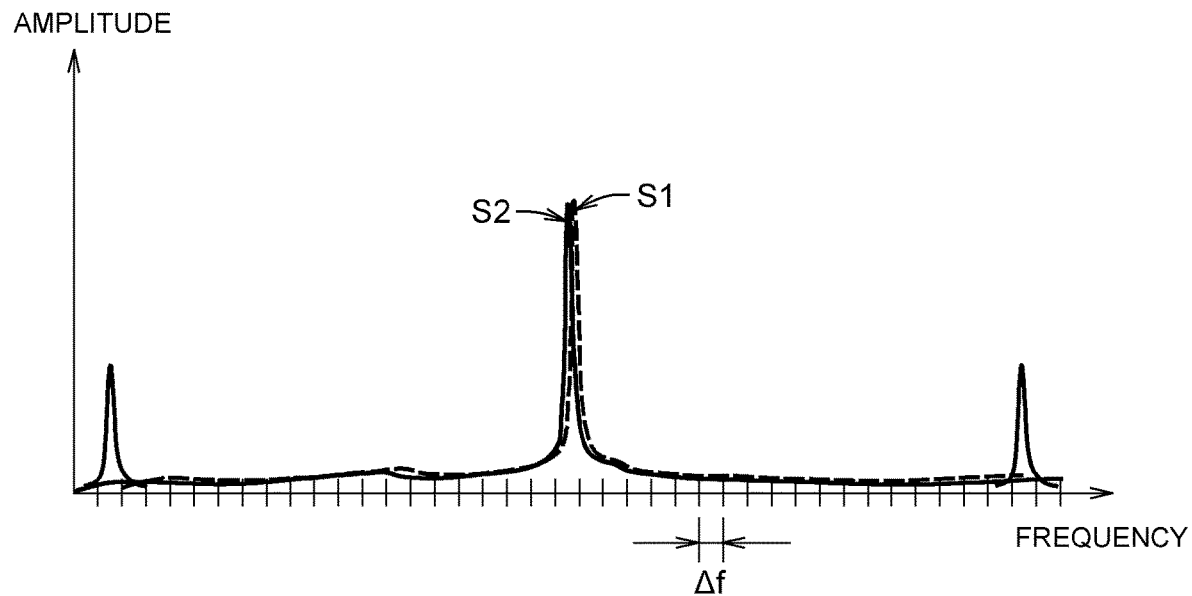
FIG. 7 is a graph illustrating another example of Doppler shift spectrum components.

FIG. 7 is a graph illustrating an example of the Doppler shift spectrum components S1 and S2 when the emission wavelengths $\lambda_1$ and $\lambda_2$ of the laser light sources 11 and 12 are optimized so as to satisfy in mathematical expression (3). As illustrated in FIG. 7, the peaks of the Doppler shift spectrum components S1 and S2 are within the same frequency bin. Therefore, comparing to the case of FIG. 6, a sharp peak is formed due to the superimposed Doppler shift spectrum components S1 and S2, and thus the peak detection accuracy is improved, and the calculation accuracy of the relative velocity $V_r$ is also improved.

Although, in the present embodiment, the number of independent laser light sources 11 and 12 is two, no limitation to the number is intended. The n laser light sources that output laser beams having n wavelengths $\lambda_1, \lambda_2, \ldots, \lambda_n$ (n is an integer equal to or greater than 2) that are different from each other may be used. In this case, it is desirable to select n laser light sources that output laser beams having wavelengths $\lambda_1$ to $\lambda_n$ that satisfy the above in mathematical expression (3) where the maximum wavelength of the n wavelengths $\lambda_1$ to $\lambda_n$ is $\lambda_{max}$ and the minimum wavelength of the n wavelengths $\lambda_1$ to $\lambda_n$ is $\lambda_{min}$. By selecting n laser light sources included in the primary light source in this manner, n peaks appearing corresponding to the wavelengths $\lambda_1$ to $\lambda_n$ in the received spectrum and the correction spectrum can be accommodated within the same frequency bin. As a result, sharp peaks are formed in the received spectrum and the correction spectrum, and thus the peak detection accuracy is improved, and the calculation accuracy of the relative velocity $V_r$ is also improved.

Next, the operation of the second measurement unit 60 illustrated in FIG. 2 will be described. In the second measurement unit 60, as described above, the envelope detector 61 detects the envelope of the received signal DS corresponding to the carrier signal in the digital domain, and outputs an envelope detection signal indicating the detection result to the edge detector 62. The envelope detector 61 has a predetermined transmission frequency bandwidth BW for the received signal DS. The transmission frequency bandwidth BW is only required to allow a Doppler shift frequency component to pass when the velocity measurement width in the first measurement unit 40 is the maximum value $V_{max}$. Therefore, the transmission frequency bandwidth BW can be calculated on the basis of the following mathematical expression (4) for the wavelength $\lambda$ of the laser beam.

$$BW = 4 \times V_{max}/\lambda. \quad (4)$$

Figure 8:
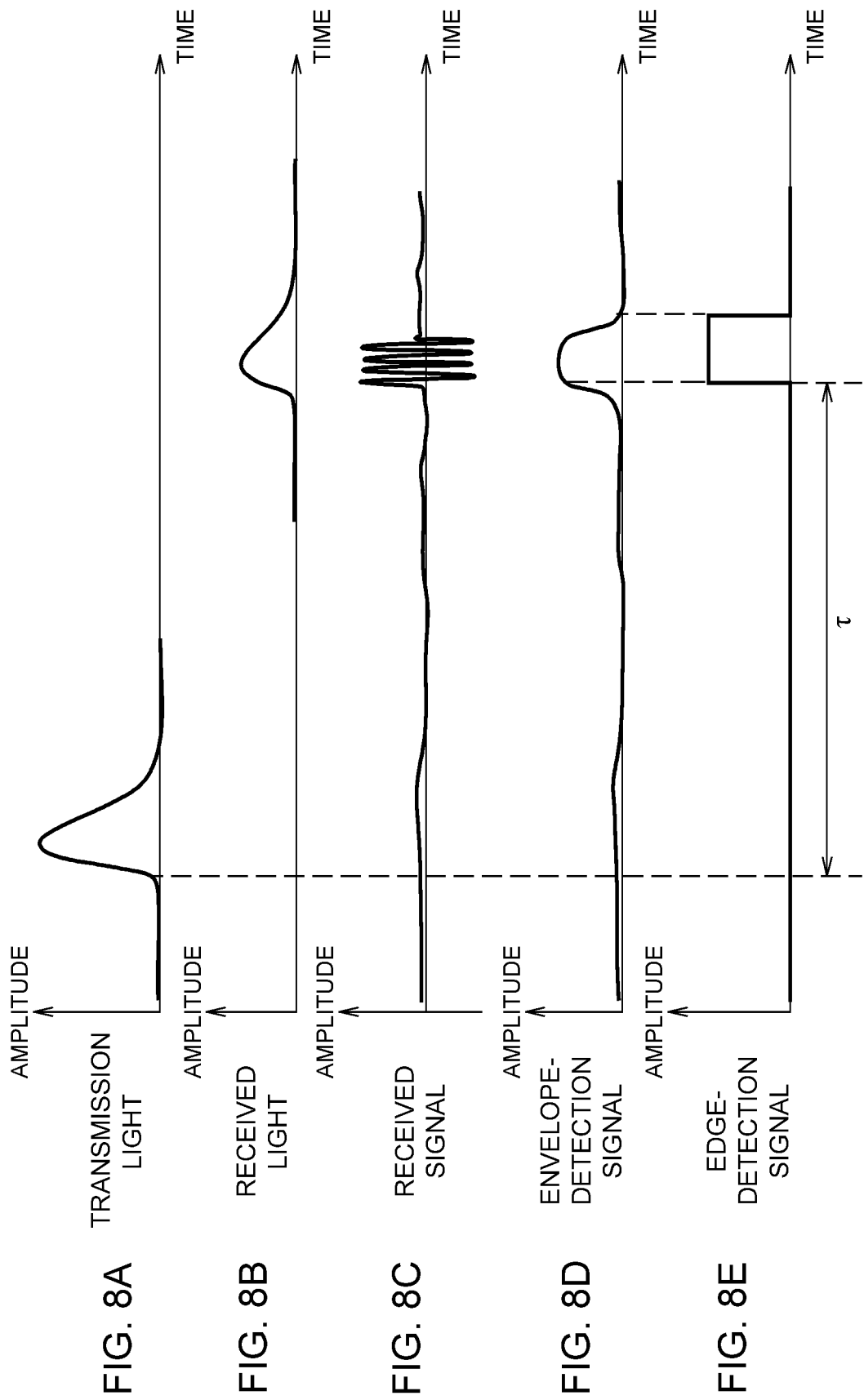
FIG. 8 includes graphs illustrating examples of transmission light, received light, a received signal (heterodyne detection signal), an envelope detection signal, and an edge detection signal according to the first embodiment.

FIGS. 8A to 8E are graphs illustrating examples of transmission light, received light, a received signal (heterodyne detection signal), an envelope detection signal, and an edge detection signal. When transmission light having the amplitude illustrated in FIG. 8A is transmitted, received light having the amplitude illustrated in FIG. 8B is received. FIG. 8C is a graph illustrating a received signal waveform obtained from the received light illustrated in FIG. 8B. FIG. 8D is a graph illustrating the waveform of an envelope detection signal obtained from the received signal waveform illustrated in FIG. 8C.

The edge detector 62 detects edges of the waveform of the envelope detection signal and outputs an edge detection signal (for example, TTL signal) indicating the detection result to the ranging unit 63. FIG. 8E is a graph illustrating the pulse waveform of the edge detection signal generated through detection of rising edges and falling edges of the waveform of the envelope detection signal illustrated in FIG. 8D.

The ranging unit 63 is capable of measuring delay time $\tau$ indicating a time difference between transmission timing of a transmission light pulse and reception timing of received light corresponding thereto and calculating the distance to the target on the basis of the delay time $\tau$. This delay time $\tau$ varies depending on the distance R to the target. The delay time $\tau$ is given by the following mathematical expression (5), for example. Where c denotes the speed of light.

$$\tau = 2 \times R/c. \quad (5)$$

As described above, according to the first embodiment, the laser radar device 1 includes the primary light source 10 that generates primary light by combining laser beams having different wavelengths $\lambda_1$ and $\lambda_2$ respectively, thereby allowing for multiple interference conditions corresponding to the different wavelengths $\lambda_1$ and $\lambda_2$ respectively which occur in the propagation path between the target and the photoreceptor surface of the photodetector 28. This allows for suppression of generation of speckle noises and for suppression of fluctuations in the intensity of the received signal DS which occur due to the speckle noises. Thus, the laser radar device 1 of the first embodiment can improve the signal-to-noise ratio of the received signal DS. Therefore, the calculation accuracy of the measurement value is improved, and the measurement value with high accuracy can be calculated even with one shot of the transmission light pulse.

In addition, according to the first embodiment, the emission wavelengths $\lambda_1$ and $\lambda_2$ of the laser light sources 11 and 12 are set such that the frequency difference between the peaks corresponding to the wavelengths $\lambda_1$ and $\lambda_2$, which appear in the spectrum of the received signal DS on which frequency analysis is not performed, is equal to or less than the frequency resolution (width of each frequency bin) $\Delta f$ for an arbitrary velocity in a velocity measurement range. This allows the peaks corresponding to the wavelengths $\lambda_1$ and $\lambda_2$ which appear in the received spectrum, to be positioned within the same frequency bin. Therefore, the detection accuracy of peaks is improved, and the calculation accuracy of measurement values is also improved.

Second Embodiment

Next, a second embodiment according to the present invention will be described. In the first embodiment, there are conditions for selecting the emission wavelengths $\lambda_1$ and $\lambda_2$ of the laser light sources 11 and 12 included in the primary light source 10. On the other hand, such selection conditions are not provided in the second embodiment. In addition, the second embodiment further includes a bandlimiting filter that limits frequency bands of an analog received signal or a digital received signal obtained by heterodyne detection and removes unwanted frequency components. Such a bandlimiting filter may be either an analog filter or a digital filter.

Figure 9:
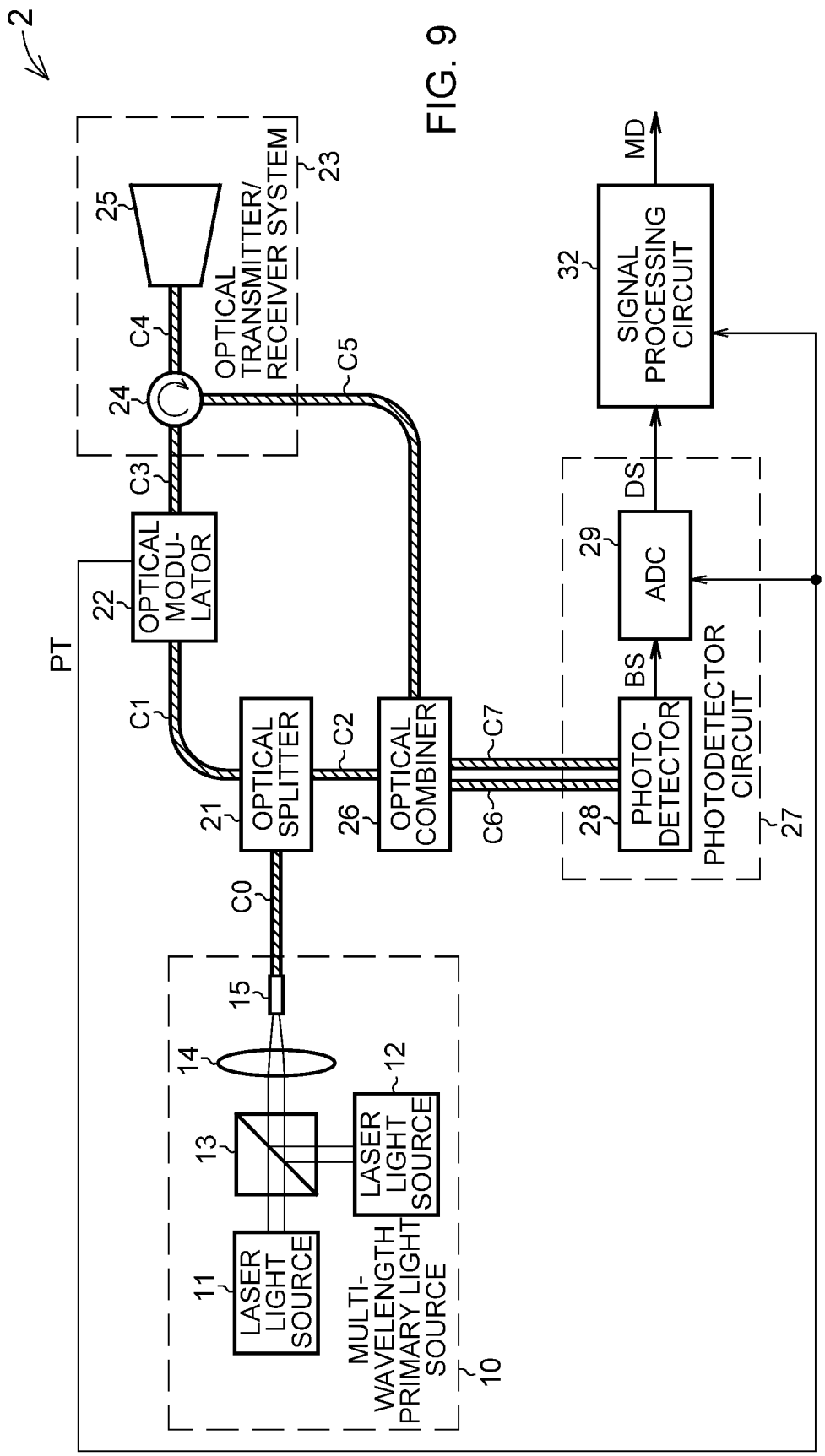
FIG. 9 is a diagram schematically illustrating a configuration example of a laser radar device according to a second embodiment of the present invention.

FIG. 9 is a diagram schematically illustrating a configuration example of a laser radar device 2 according to the second embodiment of the present invention. As illustrated in FIG. 9, the laser radar device 2 includes a primary light source 10, an optical splitter 21, an optical modulator 22, an optical transmitter/receiver system 23, an optical combiner 26, a photodetector circuit 27, and a signal processing circuit 32. The configuration of the laser radar device 2 of the present embodiment is the same as that of the laser radar device 1 of the first embodiment except that the signal processing circuit 32 of FIG. 9 is included instead of the signal processing circuit 31 (FIG. 1) of the first embodiment. In the configuration example of FIG. 9, the signal processing circuit 32 has the bandlimiting filter.

Figure 10:
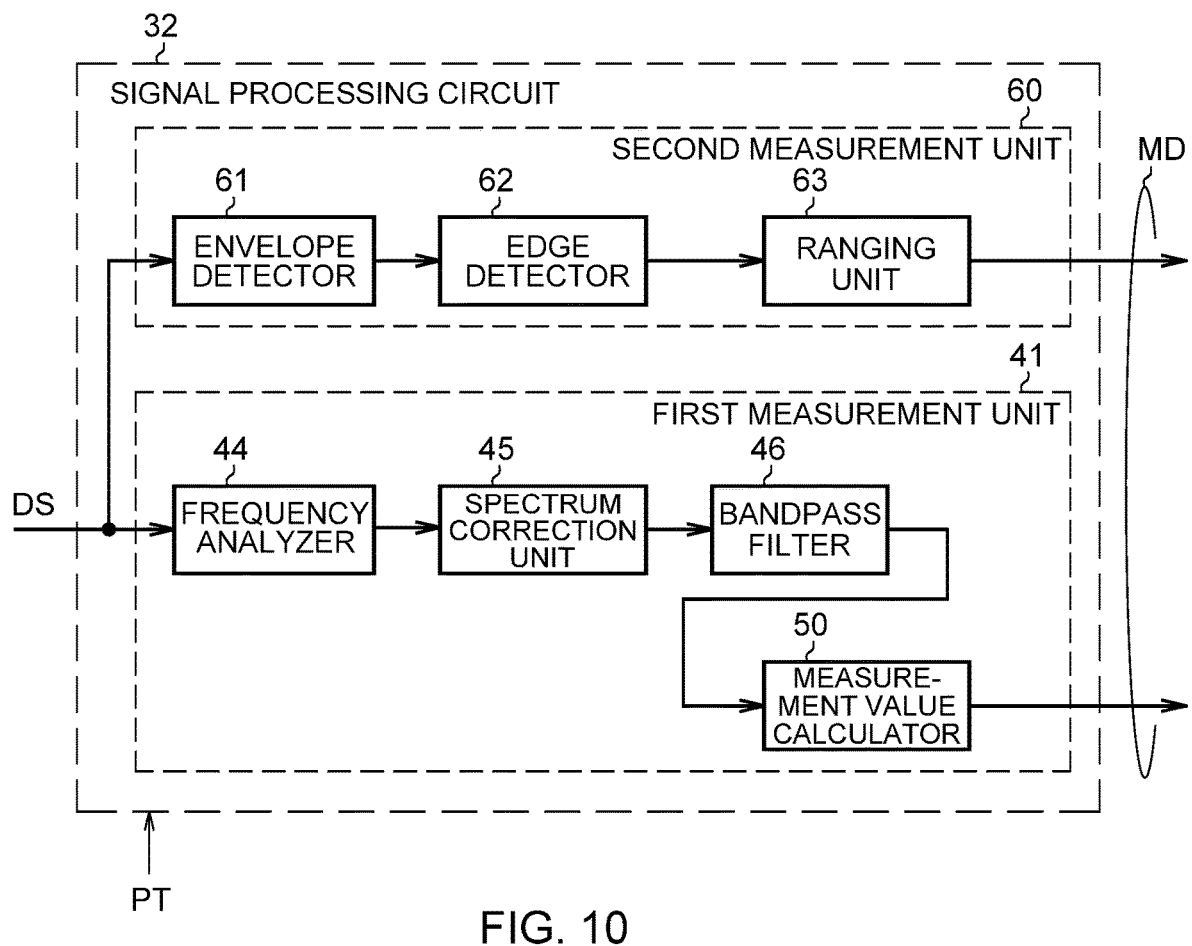
FIG. 10 is a block diagram schematically illustrating a configuration example of a signal processing circuit according to the second embodiment.

FIG. 10 is a block diagram schematically illustrating a configuration example of the signal processing circuit 32 according to the second embodiment. As illustrated in FIG. 10, the signal processing circuit 32 includes a first measurement unit 41 and a second measurement unit 60. The configuration of the second measurement unit 60 is the same as the configuration of the second measurement unit 60 of the first embodiment. The first measurement unit 41 includes a frequency analyzer 44, a spectrum correction unit 45, and a measurement value calculator 50 like the first measurement unit 40 of the first embodiment.

The first measurement unit 41 of the present embodiment further includes a bandpass filter 46 that operates as the bandlimiting filter. The bandpass filter 46 is included as a stage preceding the measurement value calculator 50, generates a band-limited spectrum by limiting the frequency band of the correction spectrum calculated by the spectrum correction unit 45, and outputs the generated band-limited spectrum to the measurement value calculator 50. The bandpass filter 46 is capable of removing unwanted frequency components by limiting the frequency band of the correction spectrum.

Figure 11:
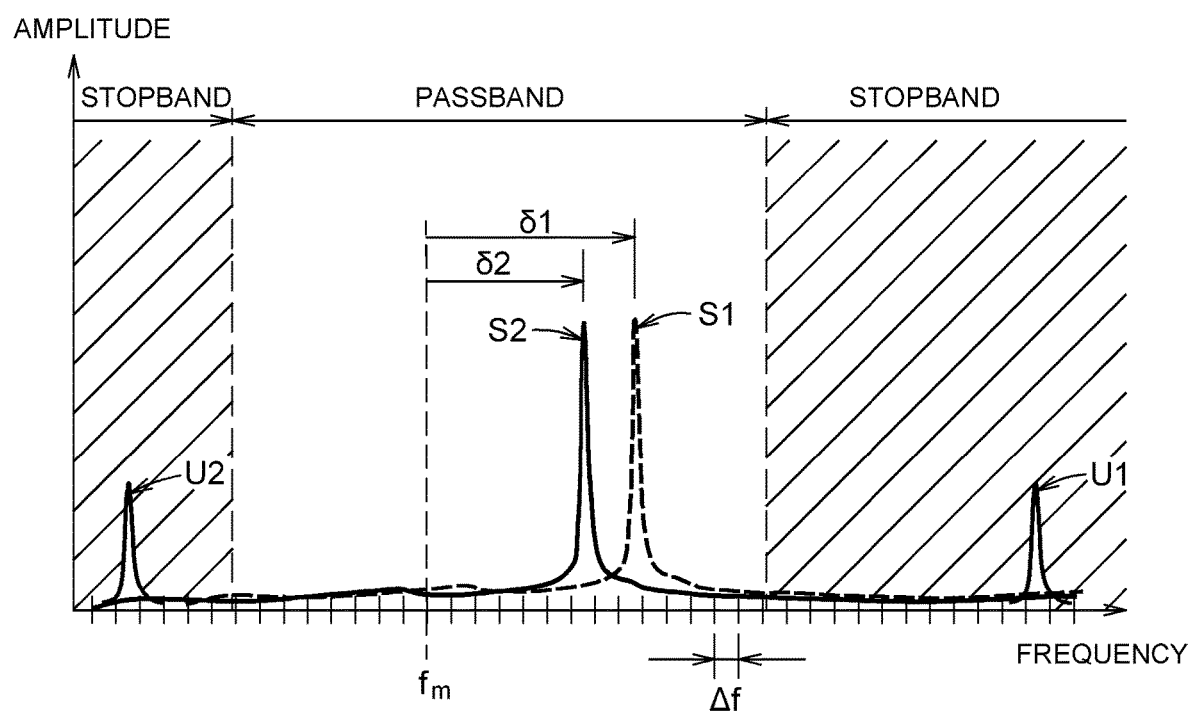
FIG. 11 is a graph illustrating an example of a passband and stopbands of a bandpass filter according to the second embodiment.

FIG. 11 is a graph illustrating an example of a passband and stopbands of the bandpass filter 46. In FIG. 11, Doppler shift spectrum components S1 and S2 corresponding to the wavelengths $\lambda_1$ and $\lambda_2$, respectively, are illustrated. Unwanted frequency components U1 and U2 such as harmonic components are removed by stopbands of the bandpass filter 46.

Upon detection of a single peak appearing in the band-limited spectrum, the measurement value calculator 50 calculates the relative velocity $V_r$ of the target on the basis of the Doppler shift amount corresponding to the detected peak. On the other hand, upon detection of peaks corresponding to wavelengths $\lambda_1$ and $\lambda_2$ respectively which appear in the band-limited spectrum, the measurement value calculator 50 calculates relative velocity components $V_{r1}$ and $V_{r2}$ of the target on the basis of the Doppler shift amounts corresponding to the detected peaks, respectively. Furthermore, the measurement value calculator 50 can calculate the relative velocity $V_r$ of the target by averaging the relative velocity components $V_{r1}$ and $V_{r2}$. It suffices to use a root mean square for the averaging process. At this point, the relative velocity $V_r$ can be calculated from the following mathematical expression (6).

$$V_r = [(V_{r1})^2 + (V_{r2})^2]^{1/2}. \tag{6}$$

When the measurement value calculator 50 has detected peaks that appear corresponding to the wavelengths $\lambda_1$ and $\lambda_2$ in the band-limited spectrum, the measurement value calculator 50 may have a function of detecting signal-to-noise ratios of the Doppler shift spectrum components corresponding to the peaks and evaluating the frequency detection accuracy for each of the Doppler shift spectrum components on the basis of the detected signal-to-noise ratios. On the basis of the evaluation result, the measurement value calculator 50 can calculate the relative velocity $V_r$ of the target only on the basis of a detected peak of a single highly-evaluated Doppler shift spectrum component without performing the averaging process.

As described above, the laser radar device 2 of the present embodiment includes the primary light source 10 as in the first embodiment, and thus it is possible to suppress generation of speckle noises and to suppress fluctuation in the intensity of the received signal DS occurring due to the speckle noises. For this reason, the signal-to-noise ratio of the received signal DS can be improved. Therefore, the calculation accuracy of the measurement value is improved, and the measurement value can be calculated with high accuracy even with one shot of the transmission light pulse.

In the second embodiment, the bandpass filter 46 generates a band-limited spectrum by limiting the frequency band of the correction spectrum calculated by the spectrum correction unit 45, and thus unwanted frequency components can be removed. Furthermore, even when the measurement value calculator 50 has detected peaks that appear corresponding to wavelengths $\lambda_1$ and $\lambda_2$ in the band-limited spectrum, the measurement value calculator 50 calculates the relative velocity components $V_{r1}$ and $V_{r2}$ of the target on the basis of the detected peaks and calculates the relative velocity $V_r$ of the target by averaging the relative velocity components $V_{r1}$ and $V_{r2}$. Therefore, even when the emission wavelengths $\lambda_1$ and $\lambda_2$ of the laser light sources 11 and 12 included in the primary light source 10 are not limited, the relative velocity $V_r$ of the target can be calculated on the basis of the detected peaks.

Although, in the present embodiment, the number of the laser light sources 11 and 12 is, no limitation to the number is intended. n laser light sources that output laser beams having n different wavelengths $\lambda_1, \lambda_2, \ldots, \lambda_n$ (n is an integer equal to or greater than 2) may be used. In this case, the measurement value calculator 50 is only required to detect the number of peaks corresponding to the number of the wavelengths. That is, the measurement value calculator 50 is only required to detect peaks that appear corresponding to the wavelengths $\lambda_1, \lambda_2, \ldots,$ and $\lambda_n$ in the band-limited spectrum and to calculate relative velocity components of the target on the basis of the detected peaks. The measurement value calculator 50 can calculate the relative velocity of the target by averaging (for example, square averaging) the relative velocity components.

Furthermore, in place of the bandpass filter 46, an analog filter that limits the frequency band of the analog received signal BS to remove unwanted frequency components, or a digital filter that limits the frequency band of the received signal DS before frequency analysis to remove unwanted frequency components may be used.

Third Embodiment

Figure 12:
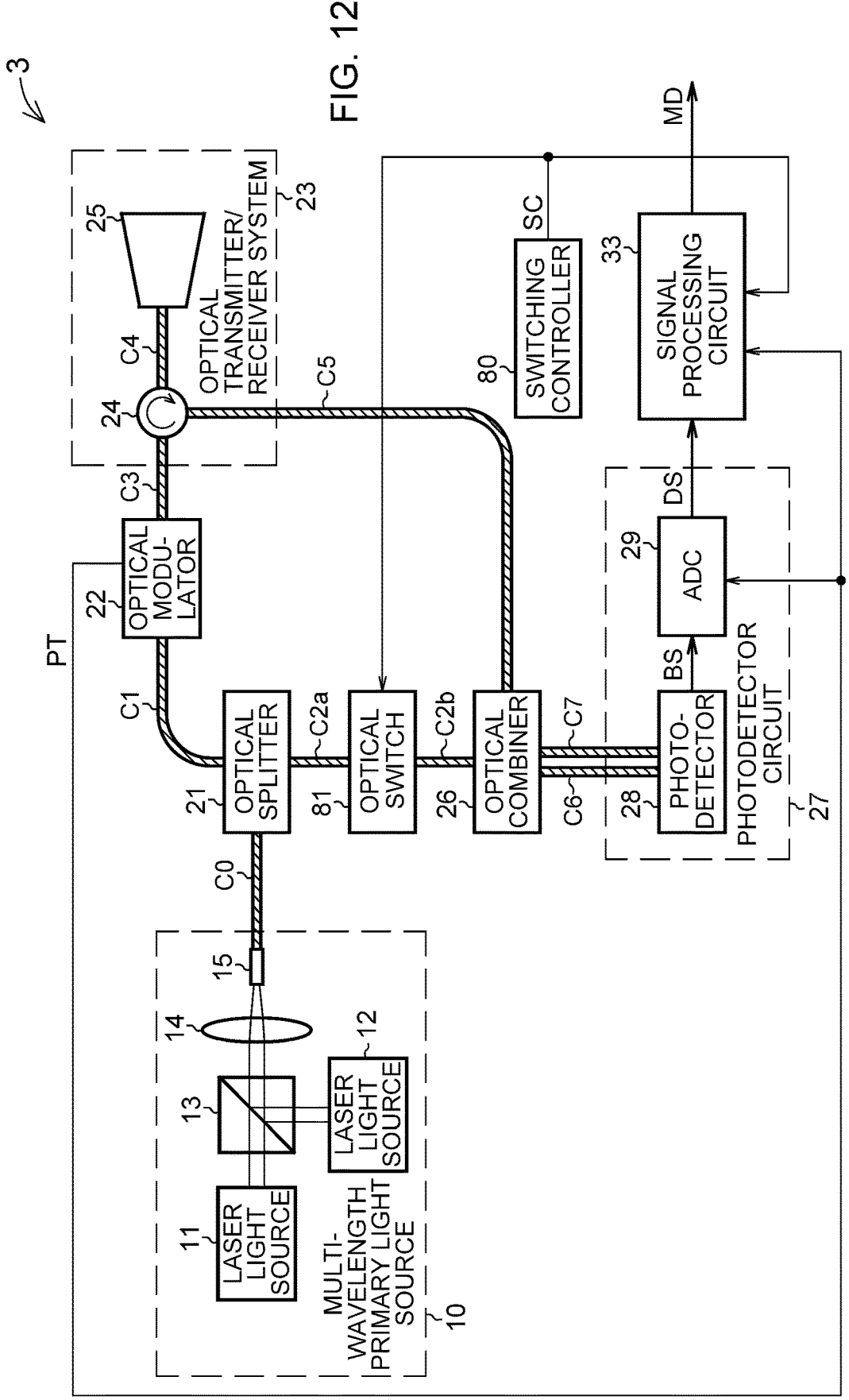
FIG. 12 is a diagram schematically illustrating a configuration example of a laser radar device according to a third embodiment of the present invention.

Next, a third embodiment according to the present invention will be described. FIG. 12 is a diagram schematically illustrating a configuration example of a laser radar device 3 according to the third embodiment of the present invention. As illustrated in FIG. 12, the laser radar device 3 includes a primary light source 10, an optical splitter 21, an optical modulator 22, an optical transmitter/receiver system 23, a switching controller 80, an optical switch 81, an optical combiner 26, a photodetector circuit 27, and a signal processing circuit 33.

The configuration of the laser radar device 3 of the present embodiment is the same as that of the laser radar device 2 of the second embodiment except that the switching controller 80 and the optical switch 81 are included and that the signal processing circuit 33 of FIG. 12 is included instead of the signal processing circuit 32 (FIG. 9) of the second embodiment.

The optical switch 81 is included in an optical transmission path between the optical splitter 21 and the optical combiner 26. The optical splitter 21 and the optical switch 81 are optically coupled to each other via an optical transmission line C2a, and the optical switch 81 and the optical combiner 26 are optically coupled to each other via an optical transmission line C2b. For example, these optical transmission lines C2a and C2b can be implemented by optical fiber cables.

The optical switch 81 is an optical separator that performs switching between wavelengths in accordance with a switching control signal SC supplied from the switching controller 80. That is, the optical switch 81 in turn selects and separates reference light components having wavelengths $\lambda_1$ and $\lambda_2$ respectively, from the reference light input from the optical transmission line C2a, in accordance with the switching control signal SC. Specifically, the optical switch 81 first separates a reference light component having the wavelength $\lambda_1$ from the reference light and outputs the reference light component to the optical transmission line C2b, and then separates the reference light component having the wavelength $\lambda_2$ from the reference light and outputs the reference light component to the optical transmission line C2b.

In this case, the optical combiner 26 first combines the reference light component with the wavelength $\lambda_1$ and the received light to generate composite light, and outputs the composite light to the photodetector circuit 27. Next, the optical combiner 26 combines the reference light component with the wavelength $\lambda_2$ and the received light to generate composite light, and outputs the composite light to the photodetector circuit 27. Therefore, the photodetector circuit 27 first outputs a received signal DS corresponding to the reference light component with the wavelength $\lambda_1$ (hereinafter referred to as "first received signal DS1") to the signal processing circuit 33, and then outputs a received signal DS corresponding to the reference light component with the wavelength $\lambda_2$ (hereinafter referred to as "second received signal DS2") to the signal processing circuit 33.

Figure 13:
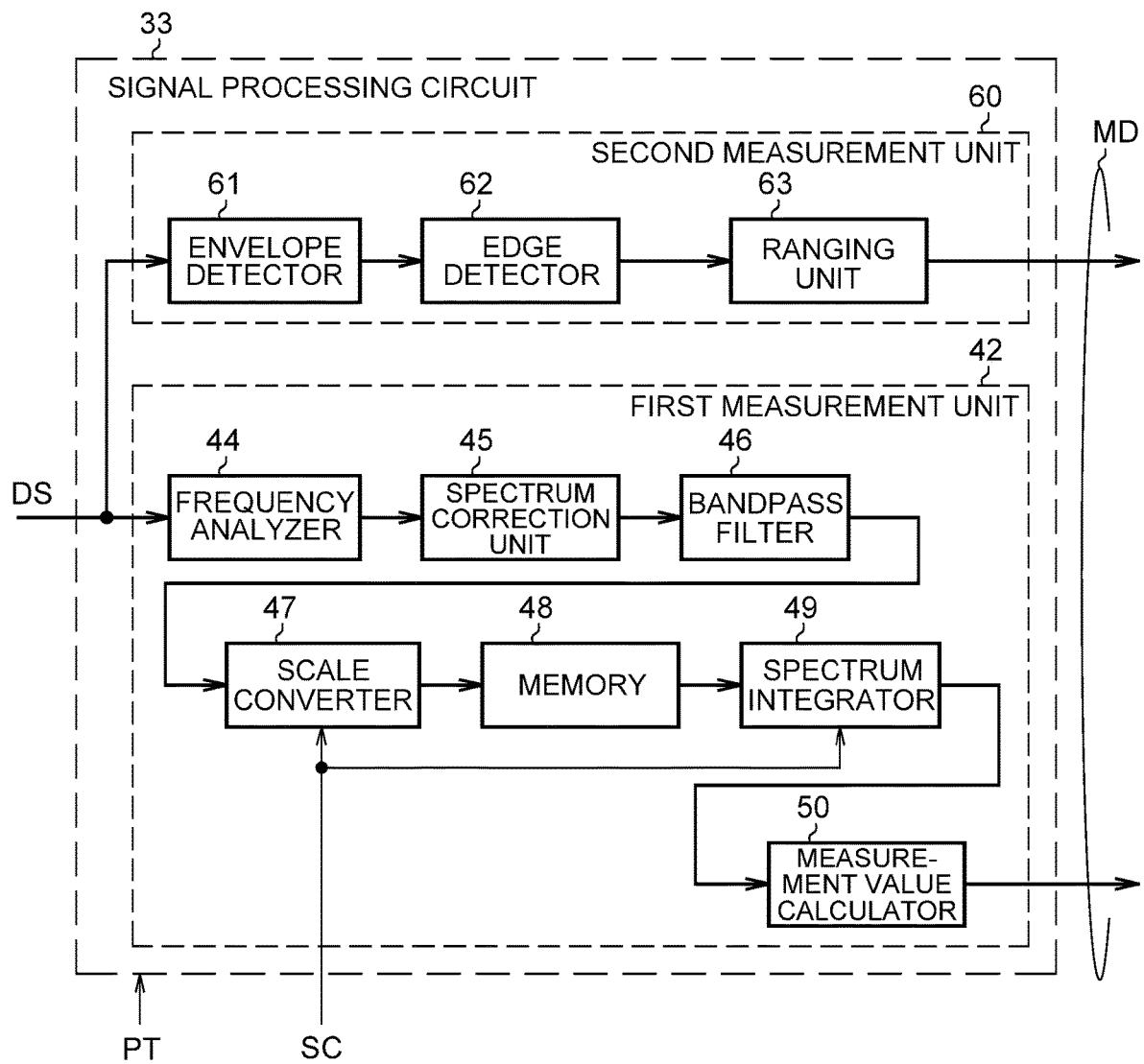
FIG. 13 is a block diagram schematically illustrating a configuration example of a signal processing circuit according to the third embodiment.

FIG. 13 is a block diagram schematically illustrating a configuration example of the signal processing circuit 33 according to the third embodiment. As illustrated in FIG. 13, the signal processing circuit 33 includes a first measurement unit 42 and a second measurement unit 60. The configuration of the second measurement unit 60 is the same as the configuration of the second measurement unit 60 of the first embodiment. Like in the first measurement unit 41 of the second embodiment, the first measurement unit 42 includes a frequency analyzer 44, a spectrum correction unit 45, a bandpass filter 46, and a measurement value calculator 50. The first measurement unit 42 of the present embodiment further includes a scale converter 47 that operates in synchronization with a switching control signal SC, a memory 48 that temporarily stores an output of the scale converter 47, and a spectrum integrator 49 that operates in synchronization the switching control signal SC.

The bandpass filter 46 first generates a band-limited spectrum corresponding to the first received signal DS1 (hereinafter referred to as "first band-limited spectrum"), and then generates a band-limited spectrum corresponding to the second received signal DS2 (hereinafter referred to as "second band-limited spectrum"). The scale converter 47 converts, using one of the first and second band-limited spectra as a reference spectrum, the scale of the other band-limited spectrum in the frequency axis direction with a predetermined conversion coefficient k. As a result, it becomes possible to cause the position on the frequency axis of the Doppler shift spectrum component appearing in the scale-converted spectrum to substantially coincide with the position on the frequency axis of the Doppler shift spectrum component appearing in the reference spectrum and to have these Doppler shift spectrum components accommodated in the same frequency bin (frequency bin of the reference spectrum). The scale converter 47 temporarily stores data indicating the reference spectrum and the scale-converted spectrum, in the memory 48.

Figure 14A:
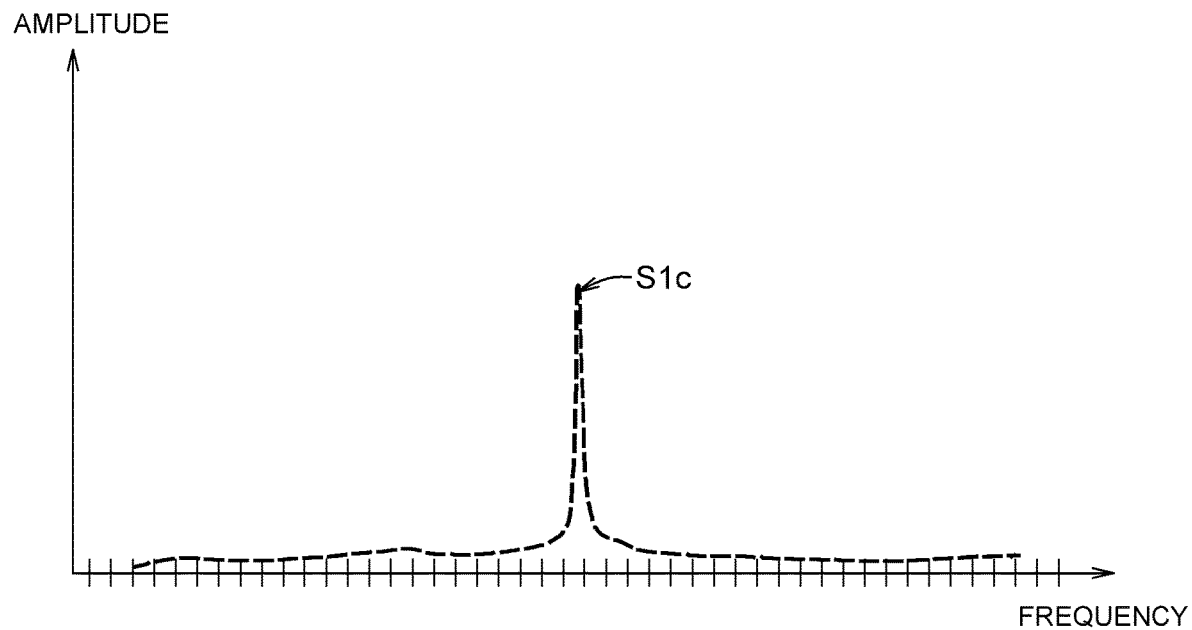
FIGS. 14A and 14B are graphs illustrating examples of Doppler shift spectrum components.
Figure 14B:
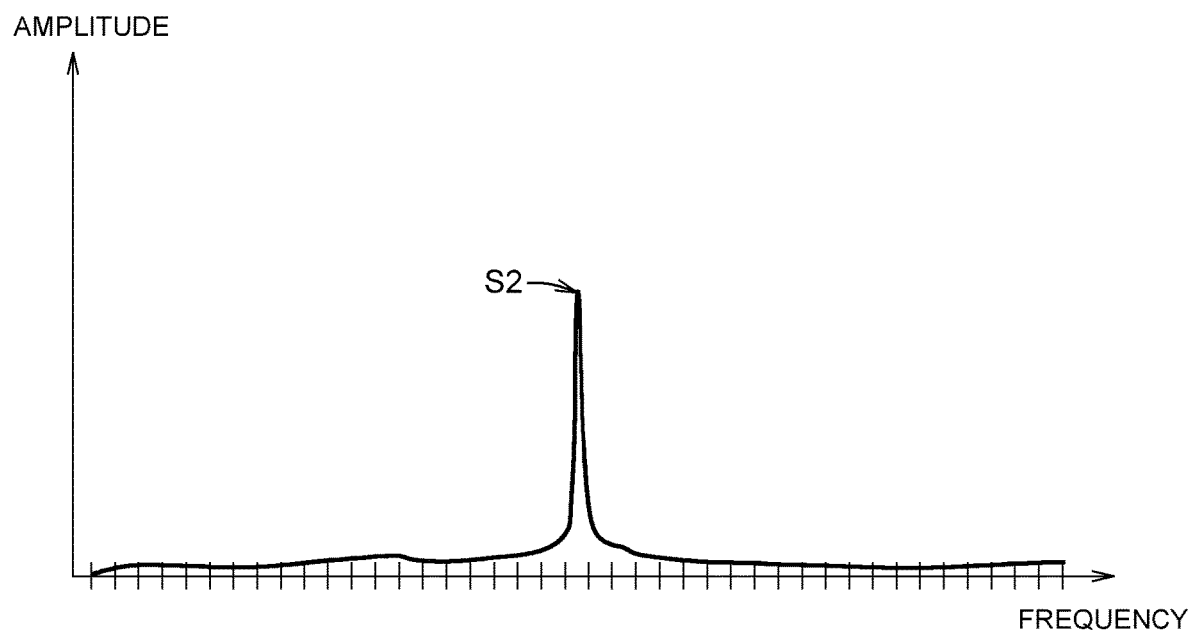

For example in a case where the second band-limited spectrum is selected as the reference spectrum, the scale in the frequency axis direction of the first band-limited spectrum can be converted with the conversion coefficient $k=\lambda_2/\lambda_1$. FIG. 14A is a graph illustrating an example of the first band-limited spectrum including a Doppler shift spectrum component S1c obtained by the scale conversion, and FIG. 14B is a graph illustrating an example of the second band-limited spectrum including a Doppler shift spectrum component S2. As illustrated in FIGS. 14A and 14B, the position of the Doppler shift spectrum component S1c matches the position of the frequency bin of the Doppler shift spectrum component S2.

The spectrum integrator 49 reads data indicating the reference spectrum and the scale-converted spectrum from the memory 48 and integrates the reference spectrum and the scale-converted spectrum to calculate an integration spectrum. The measurement value calculator 50 detects a peak appearing in the integration spectrum by the maximum-value detection or centroid method, and calculates the Doppler shift amount on the basis of the position of the detected peak. The measurement value calculator 50 can calculate the relative velocity of the target in the line-of-sight direction from the Doppler shift amount.

The peak position of the Doppler shift spectrum component appearing in the scale-converted spectrum substantially coincides with the peak position of the Doppler shift spectrum component appearing in the reference spectrum. Therefore, a sharp peak is formed in the integration spectrum at the position of a single frequency bin through superimposition these Doppler shift spectrum components. As a result, the measurement value calculator 50 can detect the peak with high accuracy, and thus the relative velocity of the target can be calculated with high accuracy.

According to the third embodiment as described above, the laser radar device 3 includes the primary light source 10 as in the first embodiment, and thus it is possible to suppress generation of speckle noises and to suppress fluctuation in the intensity of the received signal DS occurring due to the speckle noises. For this reason, the signal-to-noise ratio of the received signal DS can be improved. Furthermore, since the signal processing circuit 33 of the laser radar device 3 includes the spectrum integrator 49 that calculates an integration spectrum, the measurement value calculator 50 can calculate a measurement value on the basis of a low-noise integration spectrum. Therefore, the calculation accuracy of the measurement value is improved, and the measurement value can be calculated with high accuracy even with one shot of the transmission light pulse.

In addition, since the signal processing circuit 33 includes the scale converter 47, it is possible to cause the position on the frequency axis of the Doppler shift spectrum component appearing in the scale-converted spectrum to substantially coincide with the position on the frequency axis of the Doppler shift spectrum component appearing in the reference spectrum. Therefore, a sharp peak is formed in the integration spectrum at the position of a single frequency bin through superimposition of the Doppler shift spectrum components. Therefore, the laser radar device 3 according to the present embodiment can calculate a measurement value related to the target with high accuracy on the basis of the detected peaks even when emission wavelengths $\lambda_1$ and $\lambda_2$ of the laser light sources 11 and 12 included in the primary light source 10 are not limited.

Although, in the present embodiment, the number of the laser light sources 11 and 12 is two, no limitation to the number is intended. n laser light sources that output laser beams having n different wavelengths $\lambda_1, \lambda_2, \ldots, \lambda_n$ (n is an integer equal to or greater than 2) may be used.

Like in the case of the second embodiment, also in the present embodiment, an analog filter that limits the frequency band of the analog received signal BS to remove unwanted frequency components, or a digital filter that limits the frequency band of the received signal DS before frequency analysis to remove unwanted frequency components may be used in place of the bandpass filter 46.

Fourth Embodiment

Next, a fourth embodiment according to the present invention will be described. The fourth embodiment is a modification of the third embodiment and is configured to achieve effects similar to those of the third embodiment.

Figure 15:
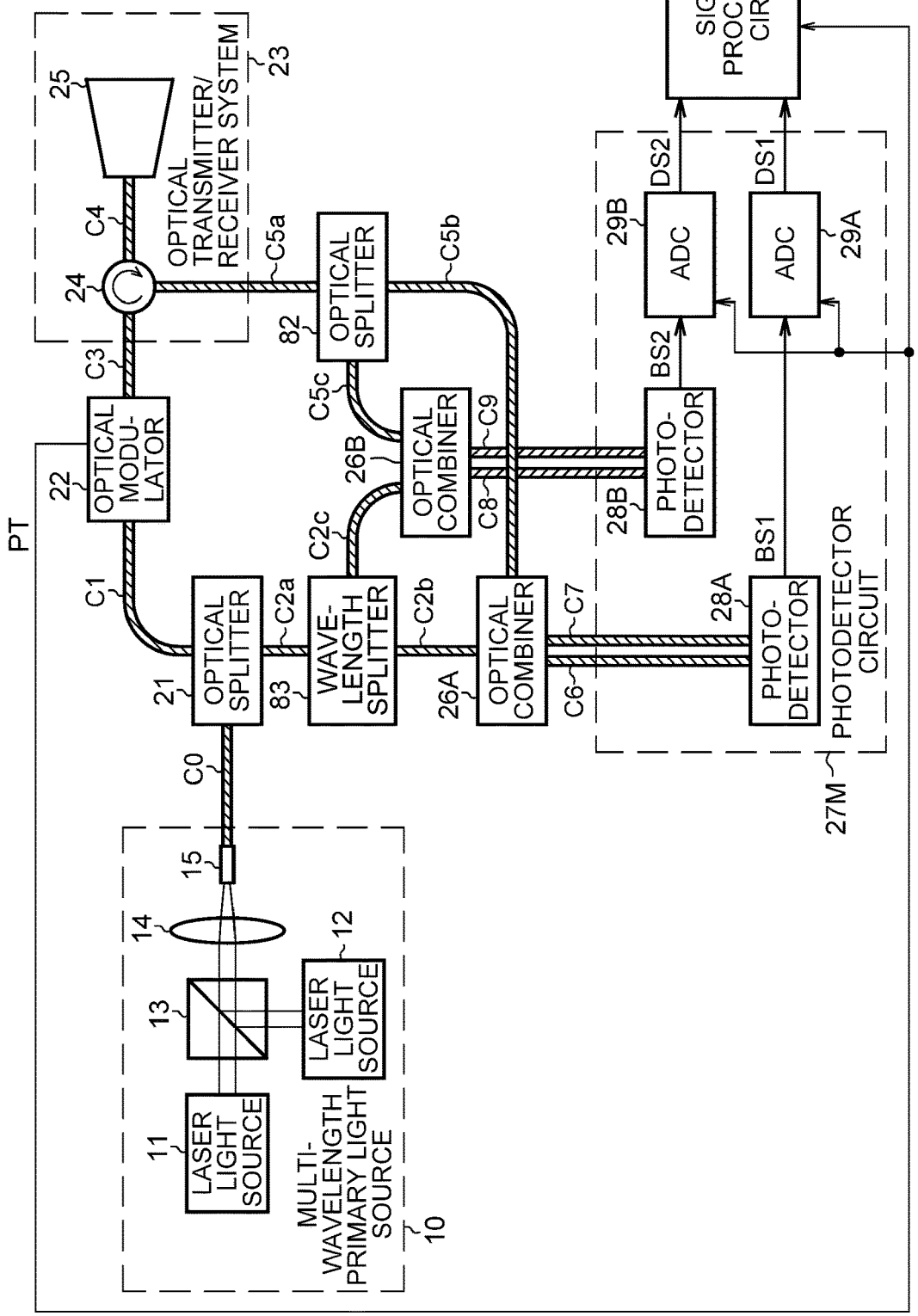
FIG. 15 is a diagram schematically illustrating a configuration example of a laser radar device according to a fourth embodiment of the present invention.

FIG. 15 is a diagram schematically illustrating a configuration example of a laser radar device 4 that is the fourth embodiment of the present invention. As illustrated in FIG. 15, the laser radar device 4 includes a primary light source 10, an optical splitter 21, an optical modulator 22, and an optical transmitter/receiver system 23 like the laser radar device 3 of the third embodiment. The laser radar device 4 of the present embodiment further includes an optical splitter 82, a wavelength splitter 83, optical combiners (optical combining elements) 26A and 26B, a photodetector circuit 27M, and a signal processing circuit 33M.

The optical splitter 82 is included in an optical transmission line between an optical circulator 24 and the optical combiner 26A. The optical circulator 24 and the optical splitter 82 are optically coupled to each other via an optical transmission line C5a, and the optical splitter 82 and the optical combiner 26A are optically coupled to each other via an optical transmission line C5b. The wavelength splitter 83 is included in an optical transmission path between the optical splitter 21 and the optical combiner 26A. The optical splitter 21 and the wavelength splitter 83 are optically coupled to each other via the optical transmission line C2a, and the wavelength splitter 83 and the optical combiner 26A are optically coupled to each other via an optical transmission line C2b. Furthermore, the optical splitter 82 and the optical combiner 26B are optically coupled to each other via an optical transmission line C5c, and the wavelength splitter 83 and the optical combiner 26B are optically coupled to each other via an optical transmission line C2c.

The optical splitter 82 is an optical component that distributes received light that is input from the optical circulator 24 via the optical transmission line C5a to the optical transmission lines C5b and C5c. That is, the optical splitter 82 splits received light input thereto into first received light and second received light at a predetermined branching ratio (50:50), and outputs the first received light to the optical transmission line C5b and the second received light to the optical transmission line C5c. For example, the optical splitter 82 can be implemented by a branch mirror using a dielectric multilayer film filter or a beam splitter.

The wavelength splitter 83 is an optical separator that simultaneously separates reference light components having wavelengths $\lambda_1$ and $\lambda_2$ respectively, from reference light input from the optical transmission line C2a. Specifically, the wavelength splitter 83 separates the reference light component having the wavelength $\lambda_1$ from the reference light to output the reference light component to the optical transmission line C2b, and simultaneously separates the reference light component having the wavelength $\lambda_2$ from the reference light to output the reference light component to the optical transmission line C2c.

The optical combiner 26A is an optical combining element that combines the reference light input from the optical transmission line C2b and the first received light input from the optical transmission line C5b to generate composite light containing optical beat signal components. The composite light propagates through optical transmission lines C6 and C7 and enters the photodetector circuit 27M. The optical combiner 26A outputs composite light beams having their respective phases different from each other by 180° (positive-phase and negative-phase light beams), to the optical transmission lines C6 and C7, to ensure compatibility with the balanced receiver configuration of the photodetector circuit 27M. Such an optical combiner 26A can be implemented by, for example, a 90° hybrid coupler.

On the other hand, the optical combiner 26B is an optical combining element that combines the reference light input from the optical transmission line C2c and the second received light input from the optical transmission line C5c to generate composite light containing optical beat signal components. The composite light propagates through optical transmission lines C8 and C9 and enters the photodetector circuit 27M. Like the optical combiner 26A, the optical combiner 26B outputs composite light beams having their respective phases different from each other by 180° (positive-phase and negative-phase light beams), to the optical transmission lines C8 and C9, to ensure compatibility with the balanced receiver configuration of the photodetector circuit 27M. Such an optical combiner 26B can be implemented by, for example, a 90° hybrid coupler.

The photodetector circuit 27M includes photodetectors 28A and 28B each having a balanced receiver configuration, an A/D converter (ADC) 29A that converts an output of the photodetector 28A into a digital signal, and an A/D converter (ADC) 29B configured to convert an output of the photodetector 28B into a digital signal. The photodetector 28A includes two photoreceptor elements (e.g., photodiodes) that perform optical-to-electrical signal conversions of the positive-phase light beam input from the optical transmission line C6 and the negative-phase light beam input from the optical transmission line C7, respectively. The photodetector 28A generates an analog received signal BS1 on the basis of a difference between output currents of the photoreceptor elements. On the other hand, the photodetector 28B includes two photoreceptor elements (e.g. photodiodes) that perform optical-to-electrical signal conversions of the positive-phase light beam input from the optical transmission line C8 and the negative-phase light beam input from the optical transmission line C9, respectively. The photodetector 28B generates an analog received signal BS2 on the basis of a difference between output currents of the photoreceptor elements. Since the photodetector circuits 27A and 27B have their respective balanced receiver configurations, reduction of relative intensity noises (RINs) due to the primary light source 10 can be achieved.

The ADC 29A converts the analog received signal BS1 into a digital received signal DS1 (hereinafter simply referred to as "first received signal DS1") by sampling the analog received signal BS1 using a pulse trigger signal PT supplied from the optical modulator 22 as a trigger. On the other hand, the ADC 29B converts the analog received signal BS2 into a digital received signal DS2 (hereinafter simply referred to as "second received signal DS2") by sampling the analog received signal BS2 using the pulse trigger signal PT as a trigger. The ADCs 29A and 29B output the first and second received signals DS1 and DS2 to the signal processing circuit 33M. For example, the ADCs 29A and 29B can be implemented by a double-integration A/D converter, a successive-approximation A/D converter, or a parallel-comparison A/D converter.

Figure 16:
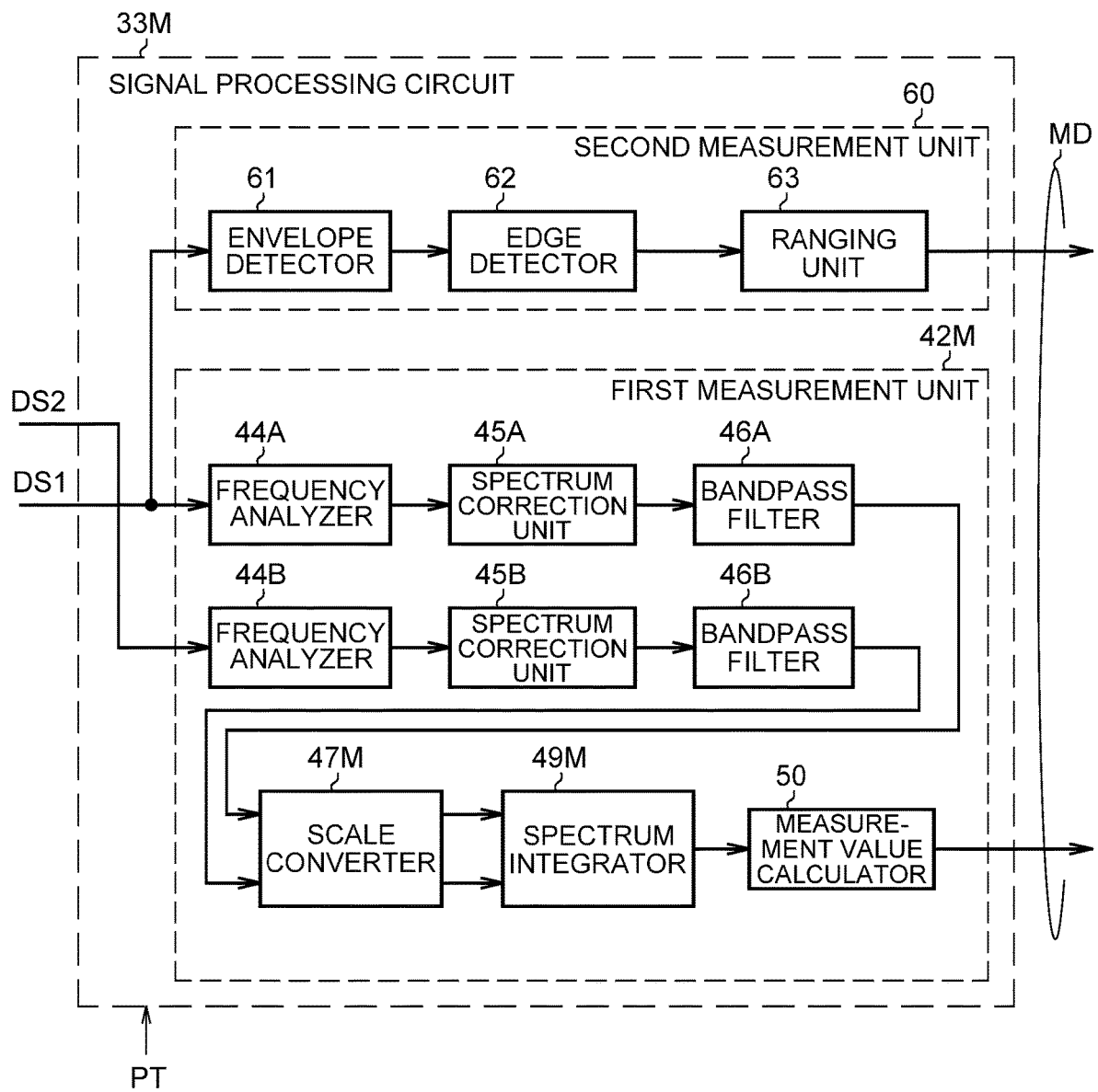
FIG. 16 is a block diagram schematically illustrating a configuration example of a signal processing circuit according to the fourth embodiment.

FIG. 16 is a block diagram schematically illustrating a configuration example of the signal processing circuit 33M according to the fourth embodiment. As illustrated in FIG. 16, the signal processing circuit 33M includes a first measurement unit 42M and a second measurement unit 60. The configuration of the second measurement unit 60 is the same as the configuration of the second measurement unit 60 of the first embodiment. The second measurement unit 60 is capable of detecting the distance to a target on the basis of the first received signal DS1.

The first measurement unit 42M includes frequency analyzers 44A and 44B, spectrum correction units 45A and 45B, bandpass filters 46A and 46B, a scale converter 47M, a spectrum integrator 49M, and a measurement value calculator 50. Here, configurations of the frequency analyzer 44A, the spectrum correction unit 45A, and the bandpass filter 46A are the same as the configurations of the frequency analyzer 44, the spectrum correction unit 45, and the bandpass filter 46 described above, and configurations of the frequency analyzer 44B, the spectrum correction unit 45B, and the bandpass filter 46B are the same as the configurations of the frequency analyzer 44, the spectrum correction unit 45, and the bandpass filter 46 described above.

The bandpass filter 46A generates a band-limited spectrum corresponding to the first received signal DS1 (hereinafter referred to as "first band-limited spectrum"). In parallel, the bandpass filter 46B generates a band-limited spectrum corresponding to the second received signal DS2 (hereinafter referred to as "second band-limited spectrum"). Like the scale converter 47 of the third embodiment, the scale converter 47M generates a scale-converted spectrum by using one of the first and second band-limited spectra as a reference spectrum and converting the scale of the other band-limited spectrum in the frequency axis direction with a predetermined conversion coefficient k.

Like the spectrum integrator 49 of the third embodiment, the spectrum integrator 49M integrates the reference spectrum and the scale-converted spectrum to calculate an integration spectrum. The measurement value calculator 50 detects a peak appearing in the integration spectrum by the maximum-value detection or centroid method, and calculates the Doppler shift amount on the basis of the position of the detected peak. The measurement value calculator 50 can calculate the relative velocity of the target in the line-of-sight direction from the Doppler shift amount.

The peak position of the Doppler shift spectrum component appearing in the scale-converted spectrum substantially coincides with the peak position of the Doppler shift spectrum component appearing in the reference spectrum. Therefore, a sharp peak is formed in the integration spectrum at the position of a single frequency bin through superimposition of these Doppler shift spectrum components. As a result, the measurement value calculator 50 can detect the peak with high accuracy, and thus the relative velocity of the target can be calculated with high accuracy.

According to the fourth embodiment as described above, the laser radar device 4 includes the primary light source 10 as in the first embodiment, and thus it is possible to suppress generation of speckle noises and to suppress fluctuation in the intensity of the received signals DS1 and DS2 occurring due to the speckle noises. For this reason, the signal-to-noise ratio of the received signals DS1 and DS2 can be improved. Furthermore, since the signal processing circuit 33M of the laser radar device 4 includes the spectrum integrator 49M that calculates an integration spectrum, the measurement value calculator 50 can calculate a measurement value on the basis of a low-noise integration spectrum. Therefore, the calculation accuracy of the measurement value is improved. The measurement value can be calculated with high accuracy even with one shot of the transmission light pulse.

In addition, since the signal processing circuit 33M includes the scale converter 47M, it is possible to cause the position on the frequency axis of the Doppler shift spectrum component appearing in the scale-converted spectrum to substantially coincide with the position on the frequency axis of the Doppler shift spectrum component appearing in the reference spectrum. Therefore, a sharp peak is formed in the integration spectrum at the position of a single frequency bin through superimposition of the Doppler shift spectrum components. Therefore, the laser radar device 4 according to the present embodiment can calculate a measurement value related to the target with high accuracy on the basis of the detected peaks even when emission wavelengths $\lambda_1$ and $\lambda_2$ of the laser light sources 11 and 12 included in the primary light source 10 are not limited.

Although, in the present embodiment, the number of the laser light sources 11 and 12 is two, no limitation to the number is intended. The n laser light sources that output laser beams having n different wavelengths $\lambda_1, \lambda_2, \ldots, \lambda_n$ (n is an integer equal to or greater than 2) may be used.

Like in the case of the second embodiment, also in the present embodiment, an analog filter that limits the frequency band of the analog received signals BS1 and BS2 to remove unwanted frequency components, or a digital filter that limits the frequency band of the received signals DS1 and DS2 before frequency analysis to remove unwanted frequency components may be used in place of the bandpass filters 46A and 46B.

Modifications of First to Fourth Embodiments

Although the various embodiments according to the present invention have been described with reference to the drawings, these embodiments are examples of the present invention, and thus various forms other than these embodiments can be adopted.

The hardware configuration of each of the signal processing circuits 32, 33, and 33M of the above-described second to fourth embodiments is only required to be implemented by, for example, one or more processors including a semiconductor integrated circuit such as a DSP, ASIC, or FPGA like in the first embodiment. Alternatively, the hardware configuration of each of the signal processing circuits 32, 33, and 33M may be implemented by one or more processors including an arithmetic device such as a CPU or GPU that executes software or firmware program codes read from a memory. The hardware configuration of each of the signal processing circuits 32, 33, and 33M may be implemented by one or more processors including a combination of a semiconductor integrated circuit such as a DSP and arithmetic device such as a CPU. Furthermore, the hardware configuration of each of the signal processing circuits 32, 33, and 33M may be implemented by the signal processing circuit 70 illustrated in FIG. 3.

In addition, the laser radar devices 1 to 4 according to the first to fourth embodiments are pulse type laser radar devices that detect a measurement value on the basis of transmission light pulses. Instead of this, the configurations of the laser radar devices 1 to 4 of the first to fourth embodiments may be modified such that measurement values are calculated by a continuous wave (CW) method.

Furthermore, although the first measurement unit 40 and the second measurement unit 60 operate in parallel in the first embodiment, instead, the configuration of the first embodiment may be modified such that only one of the first measurement unit 40 and the second measurement unit 60 or both the first measurement unit 40 and the second measurement unit 60 operate depending on a measurement parameter that defines operation conditions. In this case, the laser radar device 1 according to the first embodiment can operate in an operation mode corresponding to the measurement parameter (that is, one of an operation mode for calculating only the relative velocity of the target, an operation mode for calculating only the distance to the target, or an operation mode for calculating both the relative velocity and the distance). Likewise, the configuration of the second embodiment may be modified such that only one of the first measurement unit 41 and the second measurement unit 60 or both the first measurement unit 41 and the second measurement unit 60 operate depending on a measurement parameter, the configuration of the third embodiment may be modified such that only one of the first measurement unit 42 and the second measurement unit 60 or both the first measurement unit 42 and the second measurement unit 60 operate depending on a measurement parameter, and the configuration of the fourth embodiment may be modified such that only one of the first measurement unit 42M and the second measurement unit 60 or both the first measurement unit 42M and the second measurement unit 60 operate depending on a measurement parameter.

Within the scope of the present invention, the present invention may include a flexible combination of the first to fourth embodiments, a modification of any component of the respective embodiments, or omission of any component in the respective embodiments.

INDUSTRIAL APPLICABILITY

A laser radar device according to the present invention is capable of detecting information such as the velocity of a target by measuring light scattered or reflected by the target using a laser beam, and thus is used, for example, for an observation system for observation of atmospheric conditions and for a moving-object detection system for detection of a moving object such as a vehicle.

REFERENCE SIGNS LIST 1 to 4: laser radar devices; 10: a multi-wavelength primary light source; 11, 12: laser light sources; 13: an optical combiner; 14: an optical condensing system; 15: an optical connector; 21: an optical splitter; 22: an optical modulator; 23: an optical transmitter/receiver system; 24: an optical circulator; 25: an optical antenna; 26, 26A, 26B: optical combiners; 27, 27M: photodetector circuits; 28, 28A, 28B: photodetectors; 29: an A/D converter (ADC); 31 to 33, 33M: signal processing circuits; 40 to 42, 42M: first measurement units; 44, 44A, 44b: frequency analyzers; 45, 45A, 45B: spectrum correction units; 46, 46A, 46B: bandpass filters; 47, 47M: scale converters; 48: a memory; 49, 49M: spectrum integrators; 50: a measurement value calculator; 60: a second measurement unit; 61: an envelope detector; 62: an edge detector; 63: a ranging unit; 70: a signal processing circuit; 71: a processor; 72: a memory; 73: an input interface unit; 74: an output interface unit; 75: a signal path; 80: a switching controller; 81: an optical switch (optical separator); 82: an optical splitter; 83: a wavelength splitter (optical separator); C0 to C9: optical transmission lines; and Tgt: a target.

The invention claimed is:

1. A laser radar device comprising:
a primary light source configured to combine a plurality of laser beams having different wavelengths respectively to generate primary light;
an optical splitter configured to split the primary light into transmission light and reference light;
an optical modulator configured to modulate the transmission light to generate modulated transmission light;
an optical transmitter/receiver system configured to emit the modulated transmission light into an external space and receive light scattered or diffused by a target in the external space;
an optical combiner configured to combine the reference light and the light received by the optical transmitter/receiver system to generate an optical beat signal;
a photodetector circuit configured to perform an optical-to-electrical signal conversion of the optical beat signal to generate a received signal; and
a signal processing circuit configured to:
perform frequency analysis on the received signal with a frequency resolution specified in advance to calculate a spectrum of the received signal, where the frequency resolution is equal to a width of each frequency bin of a spectrum of the received signal; and
calculate a measurement value related to the target on a basis of the calculated spectrum,
wherein the different wavelengths are set to cause a frequency difference between peaks that correspond to the different wavelengths and appear in the spectrum of the received signal, to be equal to or less than the frequency resolution.

2. The laser radar device according to claim 1, wherein:
the signal processing circuit is further configured to calculate, as the measurement value, a relative velocity of the target in a predetermined velocity measurement range; and
the different wavelengths are set to satisfy a relational expression given by $$\Delta f > 2 \times V_{max} \times (1/\lambda_{min} - 1/\lambda_{max}),$$

where a maximum absolute value of a velocity in the velocity measurement range is denoted by $V_{max}$, a maximum wavelength of the different wavelengths is denoted by $\lambda_{max}$, a minimum wavelength of the different wavelengths is denoted by $\lambda_{min}$, and the frequency resolution is denoted by $\Delta f$.

3. The laser radar device according to claim 1, wherein a spectral linewidth of each beam of the plurality of laser beams is equal to or less than 100 MHz.

4. A laser radar device comprising:
a primary light source configured to combine a plurality of laser beams having different wavelengths respectively to generate primary light;

an optical splitter configured to split the primary light into transmission light and reference light;

an optical modulator configured to generate modulated transmission light by modulating the transmission light;

an optical transmitter/receiver system configured to emit the modulated transmission light into an external space and receive light scattered or diffused by a target in the external space;

an optical separator configured to separate, from the reference light, a plurality of reference light components having the different wavelengths respectively;

an optical combiner configured to combine the plurality of reference light components and the light received by the optical transmitter/receiver system to generate a plurality of optical beat signals;

a photodetector circuit configured to perform optical-to-electrical signal conversions of the plurality of optical beat signals to generate a plurality of received signals; and a signal processing circuit configured to:

perform frequency analysis on the plurality of received signals to calculate spectra of the plurality of received signals;

integrate the spectra to calculate an integration spectrum;

calculate a measurement value related to the target on a basis of the integration spectrum; and using one of the spectra as a reference spectrum, convert scales of one or more spectra selected from among the spectra other than the reference spectrum, in a frequency axis direction of the one or more spectra, wherein the signal processing circuit is further configured to integrate the reference spectrum and the scale-converted spectrum to calculate the integration spectrum.

5. The laser radar device according to claim 4, wherein the optical separator is configured as an optical switch configured to in turn select and separate the reference light components from the reference light.

6. The laser radar device according to claim 4, wherein:

the optical separator is configured as a wavelength splitter to simultaneously separate the plurality of reference light components from the reference light;

the optical combiner includes a plurality of optical combining elements configured to combine the light received by the optical transmitter/receiver system with the plurality of reference light components to simultaneously generate the plurality of optical beat signals; and the photodetector circuit includes a plurality of photodetectors configured to perform optical-to-electrical signal conversions of the plurality of optical beat signals to simultaneously generate the plurality of received signals, respectively.

7. The laser radar device according to claim 4, wherein a spectral linewidth of each beam of the plurality of laser beams is equal to or less than 100 MHz.

8. A laser radar device comprising:

a primary light source configured to combine a plurality of laser beams having different wavelengths respectively to generate primary light;

an optical splitter configured to split the primary light into transmission light and reference light;

an optical modulator configured to generate modulated transmission light by modulating the transmission light;

an optical transmitter/receiver system configured to emit the modulated transmission light into an external space and receive light scattered or diffused by a target in the external space;

an optical separator configured to separate, from the reference light, a plurality of reference light components having the different wavelengths respectively;

an optical combiner configured to combine the plurality of reference light components and the light received by the optical transmitter/receiver system to generate a plurality of optical beat signals;

a photodetector circuit configured to perform optical-to-electrical signal conversions of the plurality of optical beat signals to generate a plurality of received signals; and a signal processing circuit configured to:

perform frequency analysis on the plurality of received signals to calculate spectra of the plurality of received signals;

integrate the spectra to calculate an integration spectrum; and calculate a measurement value related to the target on a basis of the integration spectrum, using one of the spectra as a reference spectrum, convert scales of one or more spectra selected from among the spectra other than the reference spectrum, in a frequency axis direction of the one or more spectra, wherein the signal processing circuit is further configured to integrate the reference spectrum and the scale=converted spectrum to calculate the integration spectrum, and wherein the optical separator is configured as an optical switch configured to in turn select and separate the reference light components from the reference light.

* * * * *